(12) United States Patent
Xu et al.

(10) Patent No.: US 11,796,806 B2
(45) Date of Patent: Oct. 24, 2023

(54) HEAD-UP DISPLAY DEVICE AND MOTOR VEHICLE

(71) Applicant: FUTURUS TECHNOLOGY CO., LTD., Beijing (CN)

(72) Inventors: Junfeng Xu, Beijing (CN); Huijun Wu, Beijing (CN); Tao Fang, Beijing (CN)

(73) Assignee: FUTURUS TECHNOLOGY CO., LTD., Beijing (CN)

( * ) Notice: Subject to any disclaimer, the term of this patent is extended or adjusted under 35 U.S.C. 154(b) by 171 days.

(21) Appl. No.: 17/611,716

(22) PCT Filed: May 15, 2020

(86) PCT No.: PCT/CN2020/090604
§ 371 (c)(1),
(2) Date: Nov. 16, 2021

(87) PCT Pub. No.: WO2020/233528
PCT Pub. Date: Nov. 26, 2020

(65) Prior Publication Data
US 2022/0214543 A1 Jul. 7, 2022

(30) Foreign Application Priority Data

May 17, 2019 (CN) .......................... 201910414494.0
May 9, 2020 (CN) .......................... 202010388755.9

(51) Int. Cl.
| G09G 5/00 | (2006.01) |
| G02B 27/01 | (2006.01) |
| B60K 35/00 | (2006.01) |
| G02B 27/18 | (2006.01) |
| G03B 21/60 | (2014.01) |

(52) U.S. Cl.
CPC .......... G02B 27/0101 (2013.01); B60K 35/00 (2013.01); G02B 27/0179 (2013.01);
(Continued)

(58) Field of Classification Search
CPC ...................... G02B 27/0101; G02B 27/0179; G02B 27/18; G02B 2027/0187; G02B 5/0252;
(Continued)

(56) References Cited

U.S. PATENT DOCUMENTS

| 6,844,969 B2 | 1/2005 | Cho et al. |
| 8,773,329 B2 | 7/2014 | Sugiyama |
(Continued)

FOREIGN PATENT DOCUMENTS

| CN | 1373392 A | 10/2002 |
| CN | 102033318 A | 4/2011 |
(Continued)

*Primary Examiner* — Thuy N Pardo
(74) *Attorney, Agent, or Firm* — Dilworth & Barrese, LLP; Michael J. Musella, Esq.

(57) ABSTRACT

Disclosed are a head-up display device and a motor vehicle. The head-up display device includes an image source, a transflective device and a light control device. The image source is configured to emit light for forming an image. The transflective device is configured to reflect light that is incident on the transflective device and allow the light that is incident on the transflective device to be transmitted. The light control device includes a retroreflection element and a dispersion element arranged above the retroreflection element; the retroreflection element is configured to reflect the light that is incident on the retroreflection element in a direction opposite the incident direction of the light that is incident on the retroreflection element; and the dispersion element is configured to diffuse the light that is incident on the dispersion element.

20 Claims, 14 Drawing Sheets

(52) U.S. Cl.
CPC ............ *G02B 27/18* (2013.01); *G03B 21/60* (2013.01); *B60K 2370/1529* (2019.05); *B60K 2370/334* (2019.05); *G02B 2027/0187* (2013.01)

(58) Field of Classification Search
CPC .... G02B 5/124; G02B 5/128; G02B 27/0944; G02B 2027/0118; B60K 35/00; B60K 2370/1529; B60K 2370/334; B60K 2370/23; G03B 21/60; G03B 21/62
USPC ..................................................... 345/7, 8, 9
See application file for complete search history.

(56) References Cited

U.S. PATENT DOCUMENTS

| | | | |
|---|---|---|---|
| 9,348,140 B2 | 5/2016 | Kusaka et al. | |
| 10,684,492 B2 | 6/2020 | Xu | |
| 11,630,250 B2* | 4/2023 | Xu | G02B 30/35 359/489.07 |
| 2011/0255303 A1* | 10/2011 | Nichol | G02B 6/0053 362/606 |
| 2015/0219834 A1* | 8/2015 | Nichol | G02B 6/0028 445/24 |
| 2019/0278091 A1* | 9/2019 | Smits | H04N 13/363 |
| 2020/0033614 A1 | 1/2020 | Shi | |

FOREIGN PATENT DOCUMENTS

| | | |
|---|---|---|
| CN | 102098522 A | 6/2011 |
| CN | 104133292 A | 11/2014 |
| CN | 206523704 U | 9/2017 |
| CN | 108181716 A | 6/2018 |
| CN | 108983423 A | 12/2018 |
| CN | 109799615 A | 5/2019 |
| CN | 210666314 U | 6/2020 |
| JP | 2016194555 A | 11/2016 |

* cited by examiner

HEAD-UP DISPLAY DEVICE AND MOTOR VEHICLE

CROSS-REFERENCE TO RELATED APPLICATIONS

The present patent application claims priority of Chinese Patent Application No. 201910414494.0 filed on May 17, 2019, and priority of Chinese Patent Application No. 202010388755.9 filed on May 9, 2020, the disclosure of which is incorporated herein by reference in its entirety as part of the present application.

TECHNICAL FIELD

Embodiments of the present disclosure relate to a head-up display device and a motor vehicle.

BACKGROUND

Transportation tools have become an indispensable part of modern social life; and people use various means of transportation to improve their social work and life efficiency. Therein, various drivable tools, for example, automobiles, are widely used with improvement of social economy and people's living standards. But the use of driving tools also brings a series of problems, of which the most prominent one is driving safety. Usually, a driver will pay close attention to driving information on a driving tool dashboard to ensure reliable driving during a driving process; however, due to a limited volume of the driving tool per se, almost all driving tool consoles on the market today have cramped space; generally speaking, in order to improve a utilization rate of the driving tool console, the driving tool dashboard is designed below the console, so the driver needs to look down at relevant information on the dashboard during driving, and in actual driving, frequency of such an action of looking down at the information on the dashboard is very high, which is likely to cause distraction of the driver during the process of looking down, incurring traffic accidents.

A Head-Up Display (HUD) technology may avoid distraction caused by the driver looking down at the dashboard during driving, thereby ensuring driving safety. Specifically, HUD-related products are mounted in the driving tool drivable tool, which, on the one hand, may improve a driving safety factor, and on the other hand, may also bring a better driving experience by using the HUD-related products, meeting needs of today's high-tech life.

SUMMARY

At least one embodiment of the present disclosure provides a head-up display device, comprising an image source, a transflective device, and a light control device; the image source is configured to emit light for forming an image; the transflective device is configured to reflect light incident on the transflective device and transmit the light incident on the transflective device; the light control device comprises a retro-reflective element and a diffusing element; the retro-reflective element is configured to reflect light incident on the retro-reflective element in an direction opposite to an incident direction of the light incident on the retro-reflective element; the diffusing element is configured to diffuse light incident on the diffusing element; the image source firstly emits the light for forming the image; the light for forming the image is incident on the transflective device; the light emitted by the image source and incident on the transflective device is subjected to a first reflection by the transflective device; the light subjected to the first reflection by the transflective device is incident on the light control device, passes through the diffusing element, and then is incident on the retro-reflective element; the retro-reflective element allows the light incident on the retro-reflective element to be emitted in the direction opposite to the incident direction of the light incident on the retro-reflective element; the light emitted in the direction opposite to the incident direction of the light incident on the retro-reflective element passes through the diffusing element and is diffused by the diffusing element; the light diffused by the diffusing element is incident on the transflective device, and is subjected to a second reflection by the transflective device to form a virtual image.

For example, in at least one example of the head-up display device, the diffusing element adopts a device configured to diffuse the light incident on the diffusing element to form a beam having a certain shape.

For example, in at least one example of the head-up display device, the diffusing element is configured to diffuse the light incident on the diffusing element to form one or more beams having certain shapes.

For example, in at least one example of the head-up display device, a cross-sectional shape of the beam comprises at least one selected from the group consisting of linear shape, circular shape, elliptical shape, square shape, and rectangular shape.

For example, in at least one example of the head-up display device, the retro-reflective element comprises a substrate and a plurality of microstructures at the substrate.

For example, in at least one example of the head-up display device, a reflective layer is between the substrate and the microstructures.

For example, in at least one example of the head-up display device, reflectance of the reflective layer ranges from 50% to 95%.

For example, in at least one example of the head-up display device, the microstructure is a spatial structure comprising three faces perpendicular to each other pairwise; and the three faces are all configured as reflective surfaces.

For example, in at least one example of the head-up display device, the spatial structure adopts a hollow concave structure or adopts a structure with a solid center, and a material of the structure with the solid center comprises a transparent material; and in a case where the spatial structure adopts the hollow concave structure, three inner surfaces perpendicular to each other of the hollow concave structure are configured as the reflective surfaces; and in a case where the spatial structure adopts the structure with the solid center, three outer surfaces perpendicular to each other of the structure with the solid center are configured as the reflective surfaces.

For example, in at least one example of the head-up display device, the microstructure is a triangular pyramid structure comprising three triangles perpendicular to each other pairwise or a cubic structure comprising three rectangles perpendicular to each other pairwise.

For example, in at least one example of the head-up display device, at least one of the reflective surfaces is provided with a reflective layer; and reflectance of the reflective layer ranges from 50% to 95%.

For example, in at least one example of the head-up display device, the microstructure adopts a spherical structure.

For example, in at least one example of the head-up display device, the spherical structure adopts a structure with a solid center, and the a material of the structure with the solid center comprises a transparent material.

For example, in at least one example of the head-up display device, a surface of the transflective device comprises a free-form surface or a flat surface.

For example, in at least one example of the head-up display device, the image source adopts a projecting device; the transflective device adopts a windshield of a transportation tool; the projecting device is configured to emit light to the windshield of the transportation tool; and the light control device is below the windshield of the transportation tool.

For example, in at least one example of the head-up display device, the projecting device comprises a lens portion.

For example, in at least one example of the head-up display device, wherein the diffusing element is on a side, close to the transflective device, of the retro-reflective element.

For example, in at least one example of the head-up display device, an orthographic projection of the transflective device on a plane, where the diffusing element is located, at least partially overlaps the diffusing element.

For example, in at least one example of the head-up display device, the image source is on a side, away from the virtual image, of the transflective device; an orthographic projection of the image source on a plane where the diffusing element is located and an orthographic projection of the transflective device on the plane where the diffusing element is located are spaced apart from each other; and the orthographic projection of the image source on the plane where the diffusing element is located and the light control device are spaced apart from each other.

At least one embodiment of the present disclosure also provides a motor vehicle, which comprises the head-up display device provided by at least one embodiment of the present disclosure.

At least one embodiment of the present disclosure also provides a head-up display device, comprising a light control device, the light control device comprises a retro-reflective element and a diffusing element; the retro-reflective element is configured to reflect light incident on the retro-reflective element in a direction opposite to an incident direction of the light incident on the retro-reflective element; the diffusing element is configured to diffuse light incident on the diffusing element; light, which is emitted by an image source, for use of being incident on a transflective device, and for use of forming an image, is reflected by the transflective device to the light control device; the light reflected to the light control device passes through the diffusing element and then is reflected back to the diffusing element by the retro-reflective element; the light reflected back to the diffusing element passes through the diffusing element, is incident on the transflective device again, and is reflected by the transflective device again, to form a virtual image on a side, away from the image source, of the transflective device.

For example, in at least one example of the other head-up display device, which further comprises the transflective device, the transflective device is configured to reflect the light incident on the transflective device and transmit the light incident on the transflective device; and the diffusing element is on a side, close to the transflective device, of the retro-reflective element.

For example, in at least one example of the other head-up display device, an orthographic projection of the transflective device on a plane where the diffusing element is located at least partially overlaps the diffusing element.

For example, in at least one example of the other head-up display device, which further comprises the image source, the image source is on a side, away from the virtual image, of the transflective device; an orthographic projection of the image source on a plane where the diffusing element is located and the orthographic projection of the transflective device on the plane where the diffusing element is located are spaced apart from each other; and the orthographic projection of the image source on the plane where the diffusing element is located and the light control device are spaced apart from each other.

For example, in at least one example of the other head-up display device, the image source comprises a projecting device.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
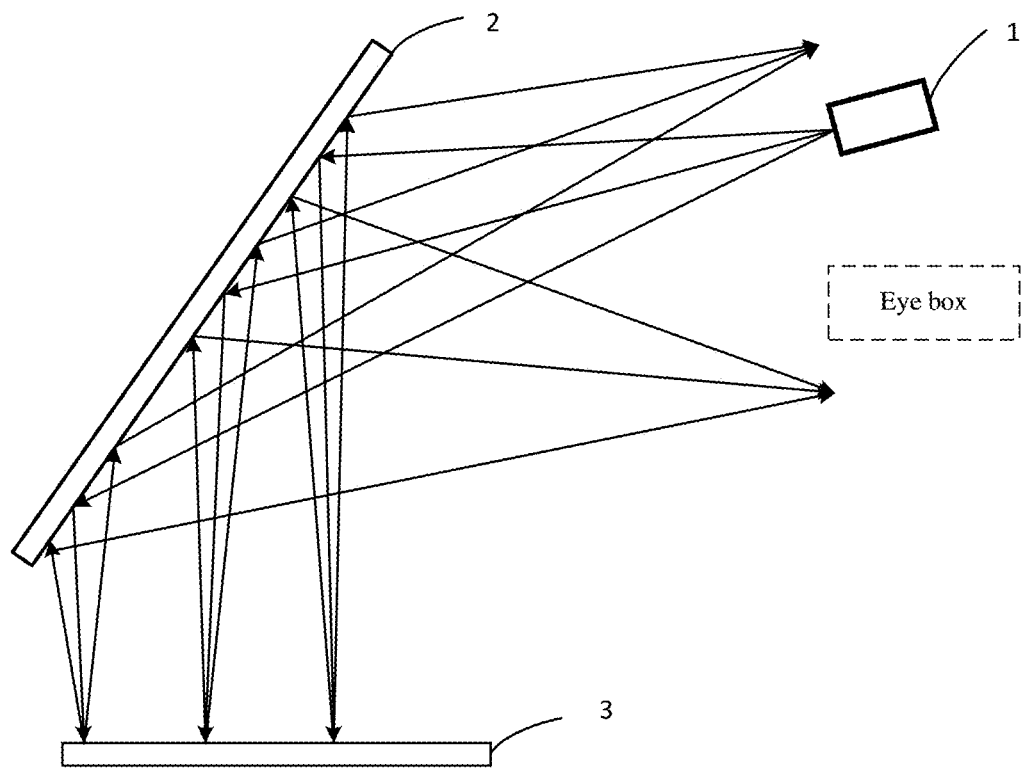
FIG. 1 is a schematic diagram I of a head-up display device provided by some embodiments of the present disclosure.

In order to make objects, technical solutions, and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventors of the present disclosure notice in research that, although there are many traditional HUD products, it is difficult to implement large-sized HUD displays through related devices and related technologies; and therefore, a new head-up display device needs to be proposed to meet large-sized HUD display demand, which will be exemplarily described below.

For example, with respect to ex-factory HUD and aftermarket HUD, the aftermarket HUD per se has a certain volume size, and an HUD image display size is too small to display richer information, for example, other complex safety information.

Traditional ex-factory HUD mainly adopts a windshield in a driving tool for displaying; the HUD image display size thereof is larger than that of aftermarket HUD, but there is also a certain defect based on the windshield displaying as for the traditional ex-factory HUD, that is, usually, a field of view is small, which is usually only within 10° when accurate to a numerical value; as a result, an actual HUD image display size is still very small, which can usually only display vehicle speed or direction information, and cannot display richer navigation map information and other complex safety information, making it difficult to meet a driver's needs for various types of information when driving the driving tool; and therefore, a large-screen HUD that uses a driving tool windshield for displaying is receiving more and more attention.

A related display displaying technology cannot fundamentally solve the problem of large-sized HUD display, but brings a series of other problems; however, in the case where the displaying technology adopts a backlight source for displaying, only a small portion of light emitted by the backlight source is used for displaying, resulting in low displaying brightness; although the problem of low displaying brightness may be solved by increasing power of the light source, this will correspondingly bring about the problems of high power consumption and large heat generation of the light source, thereby increasing heat dissipation requirements for the light source device, and cannot fundamentally solve the problem of a poor light utilization rate of the light source, and the related displaying technology will produce the problem of distorted picture instability.

At least one embodiment of the present disclosure provides a head-up display device comprising an image source, a transflective device, and a light control device. The image source is configured to emit light for forming an image; the transflective device is configured to reflect light incident on the transflective device and transmit the light incident on the transflective device; the light control device comprises a retro-reflective element and a diffusing element; the retro-reflective element is configured to reflect light incident on the retro-reflective element in a direction opposite to an incident direction of the light incident on the retro-reflective element; the diffusing element is configured to diffuse light incident on the diffusing element; the image source firstly emits light for forming the image; the light for forming the image is incident on the transflective device; the light emitted by the image source and incident on the transflective device is subjected to a first reflection by the transflective device; the light subjected to the first reflection by the transflective device is incident on the light control device, passes through the diffusing element, and then is incident on the retro-reflective element; the retro-reflective element allows the light incident on the retro-reflective element to be emergent in the direction opposite to the incident direction of the light incident on the retro-reflective element; the light emergent in the direction opposite to the incident direction of the light incident on the retro-reflective element passes through the diffusing element and is diffused by the diffusing element; the light diffused by the diffusing element is incident on the transflective device, and is subjected to a second reflection by the transflective device to form a virtual image.

For example, with respect to the head-up display device provided by at least one embodiment of the present disclosure, because a range of light irradiating on a transflective device is large, a field of view and a display region are enlarged, so that after being reflected by the transflective device, light may form a large-sized HUD image, and the reflected light is incident into a preset region, and the preset region is just an eye box, which, thus, may ensure that a large-sized HUD image is observed, and a large-sized image may be formed with lower power consumption.

Hereinafter, the present disclosure will be further explained in conjunction with the accompanying drawings.

Figure 2:
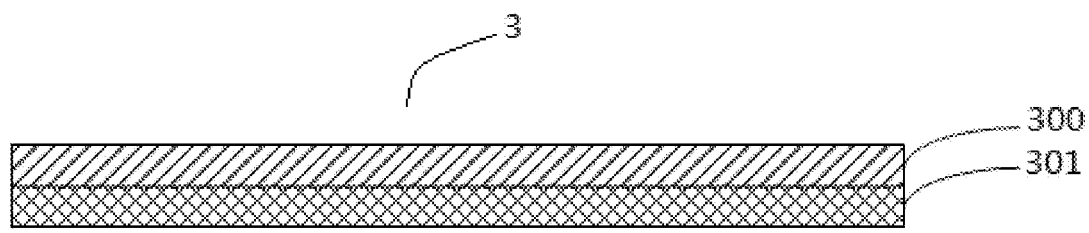
FIG. 2 is a structural schematic diagram of a light control device provided by some embodiments of the present disclosure.

A head-up display device provided by some embodiments of the present disclosure, referring to FIG. 1, includes an image source 1, a transflective device 2 and a light control device 3, the image source 1 is configured to emit light for forming an image; the transflective device 2 is configured to reflect light incident thereon and transmit the light incident thereon; referring to FIG. 2, the light control device 3 includes a retro-reflective element 301 and a diffusing element 300; the diffusing element 300 is arranged above the retro-reflective element 301; light incident on the light control device 3 firstly reaches the diffusing element 300, then passes through the diffusing element 300 and then reaches the retro-reflective element 301; the retro-reflective element 301 is configured to reflect the light incident thereon in a direction opposite to an incident direction; the diffusing element 300 is configured to diffuse the light incident thereon; the light is diffused by the diffusing element to form a beam having a certain diffusion angle; and a shape of the beam having a certain diffusion angle may be regular or irregular.

For example, FIG. 1 may be referred to for a positional relationship among the image source 1, the transflective device 2 and the light control device 3; light emitted by the image source 1 and used for forming an image propagates to the transflective device 2; the transflective device 2 reflects the light incident thereon and then reflected light propagates to the light control device 3; the light control device 3 allows incident light to be emitted again; the light emitted again reaches the transflective device 2; the transflective device 2 will reflect again the light incident thereon; the reflected light reaches a preset region; the preset region includes an eye box, and the eye box refers to a region where eyes may observe the image.

Figure 3:
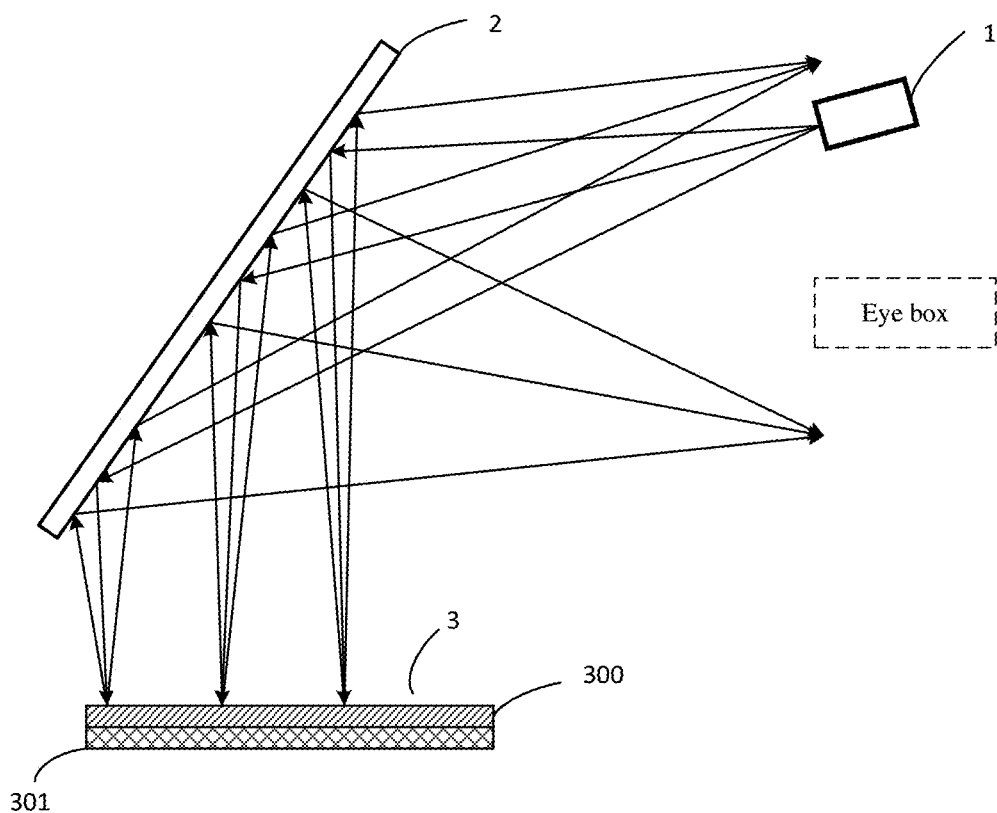
FIG. 3 is a schematic diagram II of a head-up display device provided by some embodiments of the present disclosure.
Figure 19:
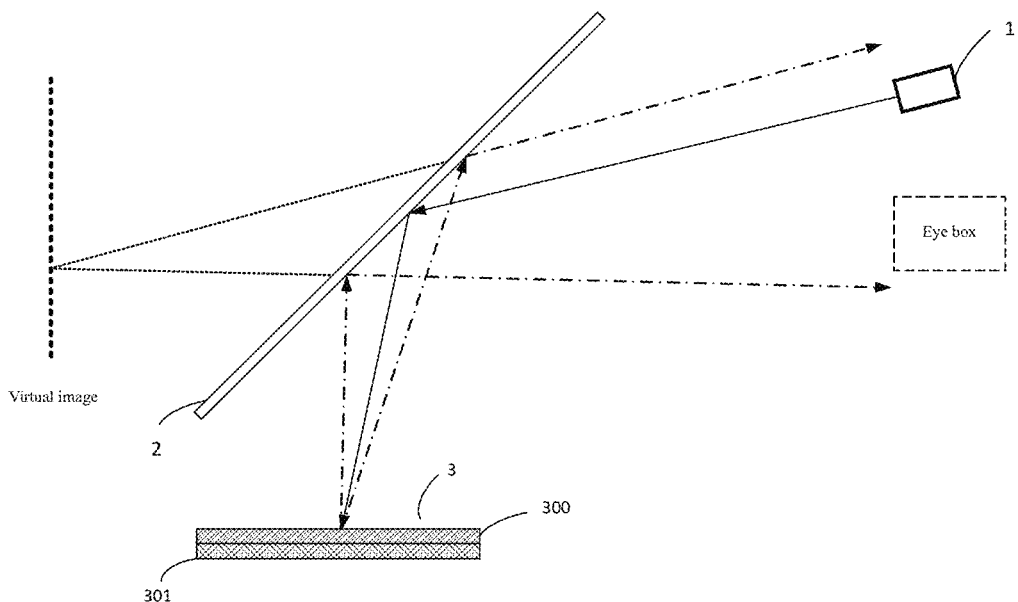
FIG. 19 is an operation schematic diagram I of a head-up display device in a transportation tool with a windshield provided by some embodiments of the present disclosure.

Referring to FIG. 3, firstly, the image source 1 emits light for forming an image; the light is incident on the transflective device 2 and is subjected to a first reflection by the transflective device 2 (the first reflection refers to reflection for a first time relative to the transflective device 2 per se); the reflected light reaches the light control device 3; the light that reaches the light control device 3 firstly reaches the diffusing element 300, passes through the diffusing element 300, and then is diffused; the diffused light is incident into the retro-reflective element 301; the retro-reflective element 301 allows the light incident thereon to be emitted in a direction opposite to an incident direction; the emergent light reaches an upper diffusing element 300 again; the diffusing element 300 re-diffuses the light incident thereon to form a beam having a certain diffusion angle; the beam having a certain diffusion angle reaches the transflective device 2; the light incident on the transflective device 2 is subjected to a second reflection by the transflective device 2 (the second reflection refers to reflection for a second time relative to the transflective device 2 per se) to form a virtual image (e.g., form the virtual image on a side, away from the image source 1, of the transflective device 2, referring to FIG. 19), and the reflected light is incident into the preset region.

For example, because a range of light irradiating on the transflective device is large, and the light has a diffusion angle after being diffused by the diffusing element, the light can form a large-sized HUD image after being reflected by the transflective device, the reflected light is incident into the preset region, and the preset region is just the eye box, which, thus, may ensure observation of the large-sized HUD image.

On the basis of the above-described solutions, for example, a transflective film is provided at the transflective device; the transflective film at the transflective device may be, but is not limited to, provided on a side, close to the image source, of the transflective device; the transflective film plays a role in efficiently reflecting the light emitted by the image source, while efficiently transmitting external ambient light inwards; and efficient use of incident light may improve brightness of the virtual image.

For example, as shown in FIG. 3, the diffusing element 300 is located on a side, close to the transflective device 2 of the retro-reflective element 301, for example, as shown in FIG. 3, a side of the light control device 3 on which the diffusing element 300 is arranged is a light incident side and a light emergent side of the light control device 3.

For example, as shown in FIG. 3, in a direction perpendicular to the light control device 3, the transflective device 2 at least partially overlaps with the diffusing element 300. For example, as shown in FIG. 3, in the direction perpendicular to the light control device 3, the transflective device 2 at least partially overlaps with the retro-reflective element 301. For example, as shown in FIG. 3, in the direction perpendicular to the light control device 3, the transflective device 2 at least partially overlaps with the light control device 3. For example, as shown in FIG. 3, in the direction perpendicular to the light control device 3, the image source 1 does not overlap with the transflective device 2. For example, as shown in FIG. 3, in the direction perpendicular to the light control device 3, the image source 1 does not overlap with the light control device 3. For example, as shown in FIG. 19, the image source 1 is located on a side, away from the virtual image, of the transflective device 2.

Figure 20:
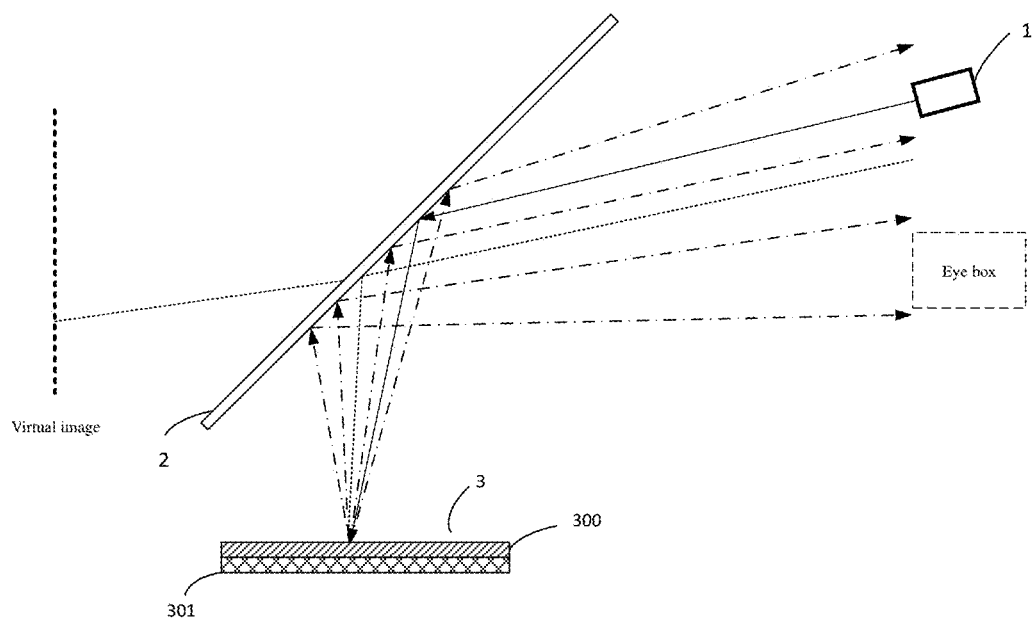
FIG. 20 is an operation schematic diagram II of a head-up display device in a transportation tool with a windshield provided by some embodiments of the present disclosure.

It should be noted that, although the head-up display device shown in FIG. 1, FIG. 3 and FIG. 20 all include the image source 1 and the transflective device 2, the embodiments of the present disclosure are not limited thereto; according to actual application needs, in some examples, at least one of the image source 1 and the transflective device 2 may be voluntarily configured by a user; in this case, the head-up display device may not include at least one of the image source 1 and the transflective device 2. For example, the head-up display device may not include the transflective device 2; in this case, for example, the transflective device 2 is implemented by a front windshield (an inner surface of the front windshield) of a motor vehicle voluntarily configured by the user.

Hereinafter, the diffusing element of the head-up display device provided by some embodiments of the present disclosure will be exemplarily described in conjunction with FIG. 4 to FIG. 8.

For example, the diffusing element adopts a device that diffuses incident light to form a beam of a certain shape; the diffusing element diffuses the incident light to form a beam of a certain shape; the beam of a certain shape refers to that a cross-sectional shape of the beam is a specific regular shape; the cross-sectional shape of the beam may be, but is not limited to, a linear shape, circular shape, elliptical shape, square shape, or rectangular shape. For example, the cross-sectional shape of the beam refers to a cross section obtained by sectioning the light leaving the diffusing element with a plane parallel to the diffusing element, that is, the cross section of the beam is parallel to the diffusing element. For another example, the cross-sectional shape of the beam refers to a cross section obtained by sectioning the light leaving the diffusing element with a plane perpendicular to a center line of the beam (i.e., a dashed line shown in FIG. 4 and FIG. 5), that is, the cross section of the beam is perpendicular to the center line of the beam.

Figure 4:
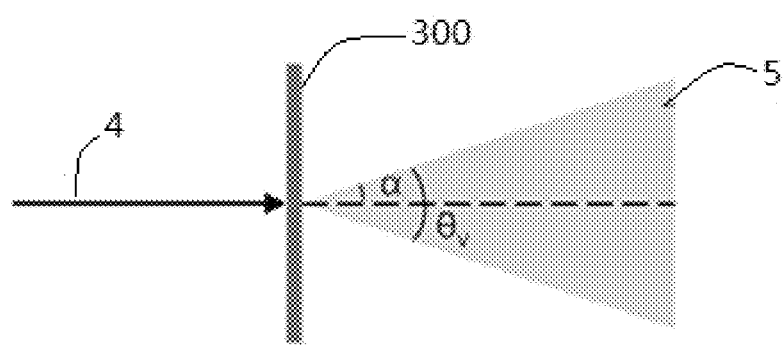
FIG. 4 is a side view of a light path of a beam having a linear, circular, elliptical, square, or rectangular cross section formed by light passing through a diffusing element provided by some embodiments of the present disclosure.
Figure 5:
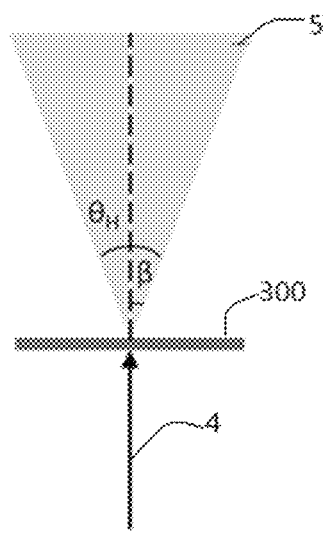
FIG. 5 is a top view of a light path of a beam having a linear, circular, elliptical, square, or rectangular cross section formed by the light passing through the diffusing element provided by some embodiments of the present disclosure.
Figure 6:
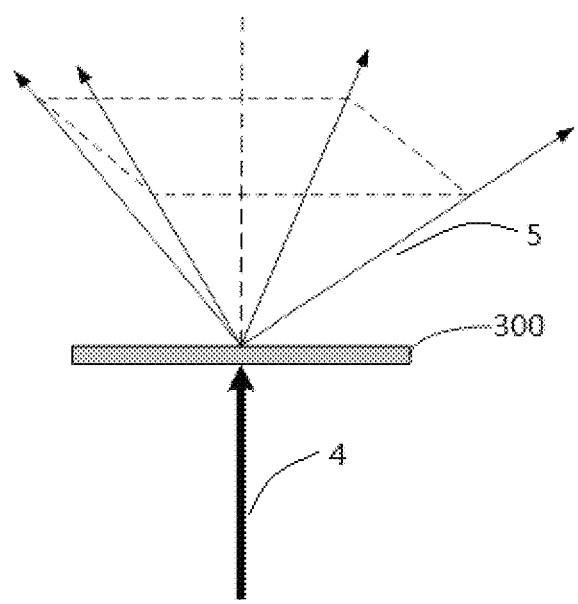
FIG. 6 is a top view of a light path of a beam having a rectangular cross section formed by the light passing through the diffusing element provided by some embodiments of the present disclosure.

For example, the diffusing element 300 may adopt a device that diffuses incident light to form a beam of a certain shape; with the device, the diffusing element 300 diffuses the incident light to form a beam of a certain shape; referring to FIG. 4 to FIG. 6, light 4 passes through the diffusing element 300 and is diffused by the diffusing element 300 to form a beam 5 of a certain shape; a diffusion degree, that is, a diffusion angle of the beam 5 depends on the diffusing element 300 per se, and the diffusion angle of the beam of a certain shape directly determines a size of a visible range and brightness of a finally formed virtual image; a specific relationship is that: the smaller the diffusion angle, the higher the displaying brightness, and the smaller the viewing angle; conversely, the larger the diffusion angle, the lower the displaying brightness, and the larger the viewing angle; so design for a reasonable beam diffusion angle is required to make displaying brightness and viewing angle be within an ideal range.

Referring to FIG. 3, the image source 1 emits light for forming an image; the light is incident onto the transflective device 2 and is subjected to a first reflection by the transflective device 2 (the first reflection refers to reflection for a first time relative to the transflective device 2 per se); the reflected light reaches the light control device 3; the light that reaches the light control device 3 firstly reaches the diffusing element 300, diffused by the diffusing element 300 to form a beam, and then is incident on the retro-reflective element 301; the retro-reflective element 301 allow the light incident thereon to be emitted in a direction opposite to an incident direction; the emergent light reaches an upper diffusing element 300 again; the diffusing element 300 re-diffuses the light incident thereon to form a beam having a certain shape; the two diffusions acting on the light by the above-described diffusing element 300 jointly determine a cross-sectional shape of the finally formed beam; the beam of the certain shape reaches the transflective device 2; the beam incident on the transflective device 2 is subjected to a second reflection by the transflective device 2 (the second reflection refers to reflection for a second time relative to the transflective device 2 per se) to form a virtual image, and the reflected light is incident into the preset region; in some embodiments of the present disclosure, the diffusing element 300 diffuses light to form a beam of a certain shape, and energy of light in the beam is evenly distributed. The beam having a certain shape irradiates on the transflective device and is reflected to form the virtual image, and energy of the beam having a certain shape is concentrated; in the case where light irradiates on the transflective device and is reflected, the image formed thereby is a high-brightness image, and at least a portion (e.g., most) of the finally reflected light falls into the eye box of the head-up display device.

For example, as shown in FIG. 3, an orthographic projection of the eye box on a plane where the transflective device is located is covered (e.g., completely covered) by the transflective device.

For example, as shown in FIG. 3, the eye box at least partially overlaps with the image source 1 in the direction perpendicular to the light control device 3, that is, an orthographic projection of the eye box on the plane where the light control device 3 is located (e.g., a bottom face of the plane where the light control device 3 is located) at least partially overlaps with an orthographic projection of the image source 1 on the plane where the light control device 3 is located. For another example, the orthographic projection of the eye box on the plane where the light control device 3 is located and the orthographic projection of the image source 1 on the plane where the light control device 3 is located are spaced apart from each other.

For example, as shown in FIG. 3, the eye box does not overlap with the light control device 3 in the direction perpendicular to the light control device 3, that is, the orthographic projection of the eye box on the plane where the light control device 3 is located and the light control device 3 are spaced apart from each other.

For example, the diffusing element 300 may be, but is not limited to, a diffractive optical element; the diffractive optical element may be, but is not limited to, a beam shaper that may form beams of a variety of certain shapes; referring to FIG. 4 to FIG. 5, after passing through the diffusing element 300, the light 4 is diffused to form a beam 5 having a certain shape; a size and a shape of a light spot corresponding to the beam 5 (a cross-sectional shape of the beam 5 corresponds to a shape of the light spot) is determined by a microstructure of the diffractive optical element per se; a shape of the above-described light spot may be, but is not limited to: linear, circular, elliptical, square, and rectangular shapes. Referring to FIG. 4, FIG. 4 is a side view of a light path system corresponding to a beam having a linear, circular, elliptical, square, or rectangular cross section after light 4 passes through the diffusing element 300, where, $\theta_v$ represents an included angle between two maximum sight line axes in a vertical direction after the light passes through the diffusing element, $\theta_v \approx 2\alpha$, $\alpha$ represents an included angle between a feature axis and the maximum sight line axis in the vertical direction, and the feature axis is in a position of a dashed line shown in FIG. 4. Referring to FIG. 5, FIG. 5 is a top view of a light path system corresponding to a beam having a linear, circular, elliptical, square, or rectangular cross section after the light 4 passes through the diffusing element 300, where, $\theta_H$ represents an included angle between two maximum sight line axes in a horizontal direction, $\theta_H \approx 2\beta$, $\beta$ represents an included angle between a feature axis and the maximum sight line axis in the vertical direction, and the feature axis is in a position of a dashed line shown in FIG. 5; and FIG. 6 shows a top view of the light path system corresponding to the beam 5 having a rectangular cross section after the light 4 passes through the diffusing element 300.

For example, the diffusing element adopts a device that diffuses incident light to form a beam of a certain shape; the diffusing element diffuses the incident light to form a beam of a certain shape; the beam of a certain shape refers to that a cross-sectional shape of the beam is a specific regular shape; the cross-sectional shape of the beam may be, but is not limited to, a linear shape, circular shape, elliptical shape, square shape, or rectangular shape.

For example, in order to diffuse light in different directions, expand a visible range, and improve a utilization rate of light emitted by the image source, the diffusing element 300 may adopt a device that diffuses incident light to form a plurality of beams of certain shapes; with the device, the diffusing element 300 diffuses incident light to form a plurality of beams of certain shapes; the plurality of beams refer to two or more beams, wherein, cross-sectional shapes of the plurality of beams formed may be the same, or the cross-sectional shapes of the plurality of beams formed may also be different; and light energy is uniformly distributed in the plurality of beams formed.

Figure 7:
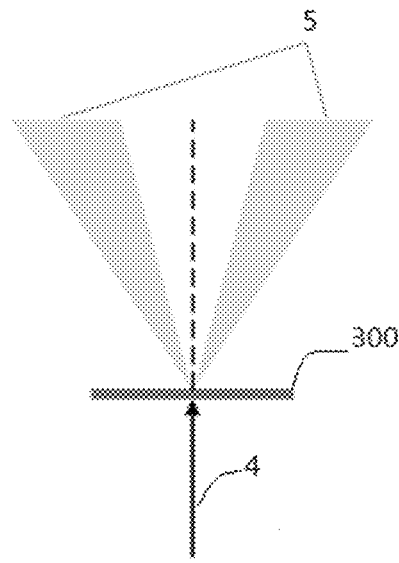
FIG. 7 is a top view of two beams having certain shapes formed by the light passing through the diffusing element provided by some embodiments of the present disclosure.
Figure 8:
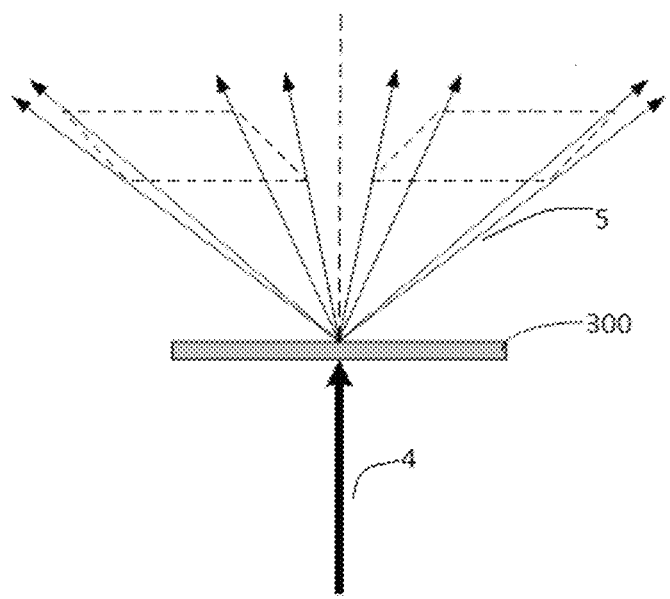
FIG. 8 is a top view of a light path of two beams both having rectangular cross sections formed by the light passing through the diffusing element provided by some embodiments of the present disclosure.

For example, referring to FIG. 7 and FIG. 8, the light 4 passes through the diffusing element 300 and is diffused by the diffusing element 300 to form two beams of certain shapes; diffusion degrees, that is, diffusion angles of the two beams of certain shapes both depend on the diffusing element per se; a size of the diffusion angle of the beam of a certain shape directly determines a size and brightness of a finally formed virtual image; a specific relationship is that: the smaller the diffusion angle, the higher the displaying brightness, and the smaller the viewing angle; conversely, the larger the diffusion angle, the lower the displaying brightness, the larger the viewing angle; so design for a reasonable beam diffusion angle is required to make displaying brightness and viewing angle be within an ideal range; cross-sectional shapes of the two beams 5 of certain shapes formed by diffusion of the diffusing element 300 are the same, and light energy is distributed uniformly in the two beams.

For example, referring to FIG. 3, the image source 1 emits light for forming an image; the light is incident on the transflective device 2 and is subject to a first reflection by the transflective device 2 (the first reflection refers to reflection for a first time relative to the transflective device 2 per se); the reflected light reaches the light control device 3, and the light that reaches the light control device 3 firstly reaches the diffusing element 300, passes through the diffusing element 300 and then is incident on the retro-reflective element 301; the retro-reflective element 301 allows the light incident thereon to be exited in a direction opposite to an incident direction; the emergent light reaches an upper diffusing element 300 again; the diffusing element 300 diffuses the light incident thereon to form two beams having certain shapes; the two beams of certain shapes reach the transflective device 2; the beams incident on the transflective device 2 are subjected to a second reflection by the transflective device 2 (the second reflection refers to reflection for a second time relative to the transflective device 2 per se) to form a virtual image; and the reflected light is incident into two regions, one of which is an eye box. The multi-beam diffusing element may improve light efficiency, and may also implement applications such as multi-viewing-angle observation. In some embodiments of the present disclosure, the diffusing element 300 emits two or more beams of certain shapes; the beams are separated from each other; the separated beams irradiate on the transflective device and are reflected by the transflective device; the reflected light is incident into a corresponding region; the separated beams make the light emitted by the image source efficiently utilized, and also, improves brightness of the image; and for example, the multi-beam diffusing element is applied to multi-view-angle observation with strong expandability.

For example, the diffusing element 300 may be, but is not limited to, a diffractive optical element; and the diffractive optical element may be, but is not limited to, a beam shaper that can form beams of various certain shapes.

For example, with respect to a diffusing element that can diffuse a plurality of beams, specifically, the diffusing element includes a light diffusing layer and a light orientating layer; the light diffusing layer and the light orientating layer are sequentially arranged along an incident direction of the incident light, wherein, the light orientating layer emits light toward a plurality of different directions, and the light diffusing layer diffuses the light from a plurality of different directions into a plurality of beams, so that the diffusing element may diffuse the light into beams of a variety of certain shapes; and for example, the diffusing element is referred to as the multi-beam diffusing element.

Figure 24:
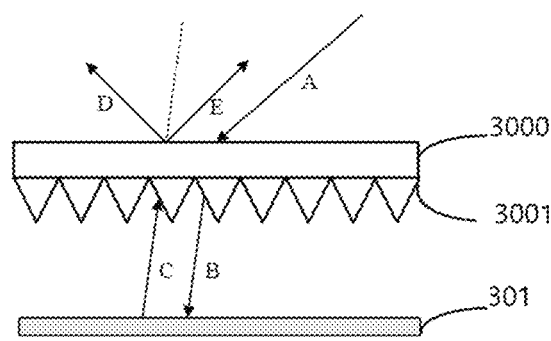
FIG. 24 is a cross-sectional schematic diagram of a diffusing element and a retro-reflective element provided by some embodiments of the present disclosure.

For example, as shown in FIG. 24, the light orientating layer 3001 is located between the light diffusing layer 3000 and the retro-reflective element 301.

Some embodiments of the present disclosure provide a head-up display device, referring to FIG. 3, which includes an image source 1, a transflective device 2 and a light control device 3, wherein, the image source 1 is configured to emit light for forming an image; the transflective device 2 is configured to reflect light incident thereon and transmit the light incident thereon; referring to FIG. 2, the light control device 3 includes a retro-reflective element 301 and a diffusing element 300; the diffusing element 300 is arranged above the retro-reflective element 301; the light incident on the light control device 3 firstly reaches the diffusing element 300, then passes through the diffusing element 300, and then reaches the retro-reflective element 301; the retro-reflective element 301 is configured to reflect light incident thereon in a direction opposite to an incident direction; and the diffusing element 300 is configured to diffuse light incident thereon.

Hereinafter, the retro-reflective element 301 of the head-up display device provided by some embodiments of the present disclosure will be exemplarily described in conjunction with FIG. 9 to FIG. 18 and FIG. 21 to FIG. 23.

Figure 9:
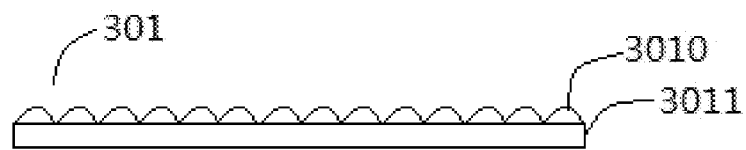
FIG. 9 is a structural schematic diagram of a retro-reflective element provided by some embodiments of the present disclosure.

For example, referring to FIG. 9, the retro-reflective element 301 includes a substrate 3011 and a plurality of reflective microstructures 3010 distributed on a surface of the substrate 3011; the reflective microstructures 3010 are, for example, uniformly distributed on the surface of the substrate 3011; and all the microstructures are, for example, uniform. For example, a reflective layer is provided between the substrate 3011 and the reflective microstructure 3010. For another example, the reflective layer is arranged on a surface of a side, away from the substrate 3011, of the reflective microstructure 3010.

For example, in the case where light is incident on the retro-reflective element 301, the light firstly passes through the reflective microstructure 3010 and then is exited from the reflective microstructure 3010; the reflective layer between the substrate 3011 and the reflective microstructure 3010 can reflect out the light entering the reflective microstructure 3010; for example, the reflective layer and the reflective microstructure 3010 are integrally formed, or the reflective layer and the substrate 3011 are integrally formed, or the reflective layer is separately provided between the substrate 3011 and the reflective microstructure 3010, or others. In the case where the light is incident on the retro-reflective element 301, the light is firstly incident on the microstructure; after the light reaches the inside of the microstructure and is subjected to one or more reflections, it is finally exited in a direction opposite to the light incident direction, so that the retro-reflective element 301 may reflect in the direction opposite to the incident light.

The reflective layer described above is for example a reflective layer having high reflectance; and reflective efficiency of the reflective layer may ranges from 50% to 95%, that is, 50% to 95% of the light incident on the retro-reflective element 301 is for example reflected by the retro-reflective element 301, which, in this way, can improve reflective efficiency of light, and further improve a utilization rate of light emitted by the image source.

For example, in the head-up display device according to some embodiments of the present disclosure, the reflective microstructure 3010 is a spatial structure composed of three faces perpendicular to each other pairwise; the three faces are all reflective surfaces; and the spatial structure is a hollow concave structure or a structure with a solid center, and the structure with the solid center is formed of a transparent material.

For example, the microstructure may be a triangular pyramid structure composed of three triangles perpendicular to each other pairwise or a cubic structure composed of three rectangles perpendicular to each other pairwise; in the case where the microstructure is a triangular pyramid structure composed of three triangles perpendicular to each other pairwise and is a hollow concave structure, a reflective layer is provided on at least one of the reflective surfaces, and reflectance of the reflective layer ranges from 50% to 95%; in the case where the microstructure is a cubic structure composed of three rectangles perpendicular to each other pairwise and is a hollow concave structure, a reflective layer is provided on at least one of the reflective surfaces, and reflectance of the reflective layer ranges from 50% to 95%; the above-described solution may improve reflective efficiency of light, thereby improving retro-reflective efficiency of the retro-reflective element, and improving a utilization rate of light emitted by the image source. In the case where the microstructure is a triangular pyramid structure composed of three triangles perpendicular to each other pairwise and is the structure with the solid center formed of the transparent material, a reflective layer is provided on at least one of the reflective surfaces, and reflectance of the reflective layer ranges from 50% to 95%; in the case where the microstructure is a cubic structure composed of three rectangles perpendicular to each other pairwise and is the structure with the solid center formed of the transparent material, a reflective layer is provided on at least one of the reflective surfaces, reflectance of the reflective layer ranges from 50% to 95%; the above-described solution may further improve reflective efficiency of the reflected microstructure light, thereby further improving retro-reflective efficiency of the retro-reflective element, and increasing a utilization rate of light emitted by the image source.

The above-described triangular pyramid structure is composed of three triangles perpendicular to each other pairwise; the triangular pyramid structure has a unique right-angled vertex; a plurality of microstructures are distributed on a surface of the substrate, that is, a plurality of triangular pyramid structures are distributed on the surface of the substrate; and the right-angled vertex corresponding to the triangular pyramid structure is located on a side close to the surface of the substrate or on a side away from the surface of the substrate, that is, there are a plurality of right-angled vertex protrusions evenly distributed on the surface of the substrate.

Similarly, the above-described cubic structure is composed of three rectangular faces perpendicular to each other pairwise; the cubic structure has at least one right-angled vertex; a plurality of microstructures are distributed on the surface of the substrate, that is, the plurality of cubic structures are distributed on the surface of the substrate; and the right-angled vertex corresponding to the cubic structure is located on a side close to the surface of the substrate or on a side away from the surface of the substrate, that is, there are a plurality of right-angled vertex protrusions evenly distributed on the surface of the substrate.

Figure 11:
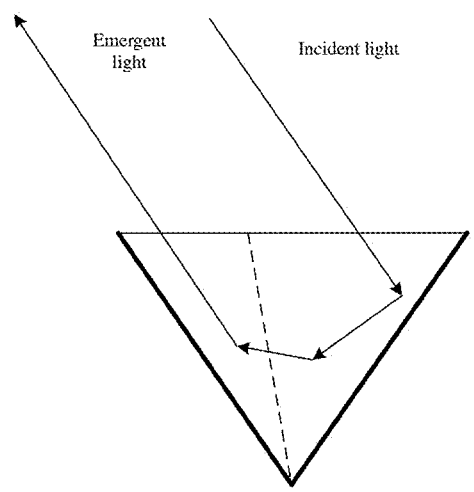
FIG. 11 is a retro-reflection principle diagram in the case where a triangular pyramid structure having an equilateral-triangular cross section provided by some embodiments of the present disclosure is a hollow concave structure.

For example, in the head-up display device according to some embodiments of the present disclosure, the reflective microstructure 3010 adopts a triangular pyramid structure having an equilateral-triangular cross section; the triangular pyramid structure is composed of three right-angled isosceles triangles perpendicular to each other pairwise; a section the triangular pyramid structure composed is an equilateral triangle, wherein, the three right-angled isosceles triangles are three reflective surfaces;

For example, referring to FIG. 11, FIG. 11 is a schematic diagram of a light path of a triangular pyramid structure having an equilateral-triangular cross section; the triangular pyramid structure is a hollow concave structure; incident light is incident on the retro-reflective element; because the triangular pyramid structure is a hollow concave structure, the incident light directly enters the inside of the triangular pyramid structure, is sequentially reflected by three reflective surfaces of the triangular pyramid structure, and then is reflected in a direction opposite to an incident direction of the incident light, so that the retro-reflective element allows the light to be exited in the direction opposite to the incident direction of the incident light.

The triangular pyramid structure having an equilateral-triangular cross section may be, but is not limited to, a hollow concave structure; and for example, a highly reflective layer is coated on the three reflective surfaces inside the triangular pyramid structure (i.e., the inner surfaces of the triangular pyramid structure that are closer to the diffusing element 300), to improve reflective efficiency of light.

Figure 10:
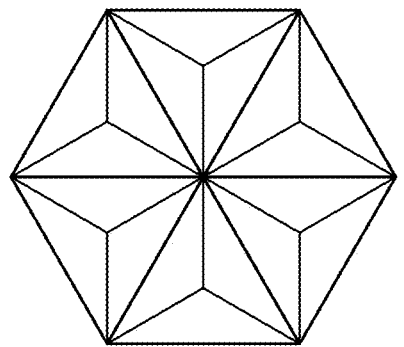
FIG. 10 is a structural schematic diagram formed by permutation and combination of six triangular pyramid structures having an equilateral-triangular cross section provided by some embodiments of the present disclosure.

FIG. 10 is a structural schematic diagram formed by regular permutation and combination of six of the above-described triangular pyramid structures; a cross section of the structure is a regular hexagonal honeycomb structure; such a structure has high reflective efficiency with respect to incident light; and when the incident light is perpendicular to a section of a triangular pyramid structure therein, reflective efficiency of the incident light reaches the highest.

For example, the structure shown in FIG. 10 includes six of the above-described triangular pyramid structures having an equilateral-triangular cross section. For example, as shown in FIG. 10, in the case where the above-described triangular pyramid structure having an equilateral-triangular cross section is implemented as a structure with a solid center, surfaces of the six triangular pyramid structures that have an equilateral-triangular shape are located on a same plane, and the surfaces the six triangular pyramid structures that have an equilateral-triangular shape are arranged in a regular hexagon. For example, in the case where the retro-reflective element 301 further includes a substrate 3011, the surfaces of the above-described six solid triangular pyramid structures that have an equilateral-triangular shape are all parallel to the surface of the substrate 3011 (e.g., they are all in direct contact with the surface of the substrate 3011). In an example, the above-described six solid triangular pyramid structures are located on a surface of the substrate 3011 that is away from the diffusing element 300; for example, in the case where the retro-reflective element 301 further includes a reflective layer, the reflective layer is located on a surface of a side of the structure composed of the six solid triangular pyramid structures that is away from the substrate 3011.

For example, in the case where the above-described triangular pyramid structure having an equilateral-triangular cross section is implemented as a hollow concave structure, for example, the six triangular pyramid structures are arranged in a similar manner, and no details will be repeated here.

For example, in the head-up display device according to some embodiments of the present disclosure, the reflective microstructure 3010 according to some embodiments of the present disclosure adopts a triangular pyramid structure having an equilateral-triangular cross section; the triangular pyramid structure is composed of three right-angled isosceles triangles perpendicular to each other pairwise; and a section of the triangular pyramid structure composed is an equilateral triangle, wherein, the three right-angled isosceles triangles are three reflective surfaces.

Figure 12:
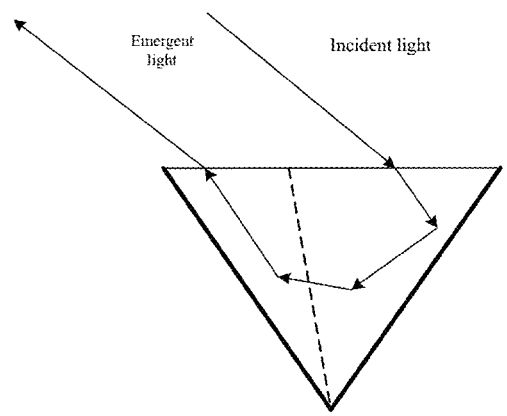
FIG. 12 is a retro-reflection principle diagram in the case where a triangular pyramid structure having an equilateral-triangular cross section provided by some embodiments of the present disclosure is a solid transparent structure.

For example, referring to FIG. 12, FIG. 12 is a schematic diagram of a light path of a triangular pyramid structure having an equilateral-triangular cross section; the triangular pyramid structure is a structure with a solid center, and a material of the structure with the solid center comprises a transparent material; incident light is incident on the retro-reflective element; because the triangular pyramid structure is a structure with a solid center, the incident light is refracted into the triangular pyramid structure, is sequentially reflected by three reflective surfaces of the triangular pyramid structure, and finally is refracted out by the triangular pyramid structure; and the light refracted out is exited in a direction opposite to an incident direction of the incident light, so that the retro-reflective element allows light to be exited in the opposite direction of the incident direction of the incident light.

In some embodiments of the present disclosure, by controlling a refractive index of the structure with a solid center, for example, light is totally reflected on the reflective surfaces inside, and a plurality of total reflections are used to implement highly-efficient reflection.

The above-described triangular pyramid structure having an equilateral-triangular cross section may be, but is not limited to, a triangular pyramid structure having an equilateral-triangular cross section; a highly reflective layer is coated on the three reflective surfaces of the solid transparent structure (e.g., outer surfaces of the triangular pyramid structure that are further away from the diffusing element 300), to improve reflective efficiency of light.

For example, in the head-up display device according to some embodiments of the present disclosure, the reflective microstructure 3010 according to some embodiments of the present disclosure adopts a triangular pyramid structure having an isosceles-triangular cross section; a section (a plane parallel to a plane determined by three hypotenuses of three right-angled triangles perpendicular to each other pairwise) of the triangular pyramid structure is an isosceles triangle, wherein, the three faces constituting the triangular pyramid structure are reflective surfaces.

Figure 22:
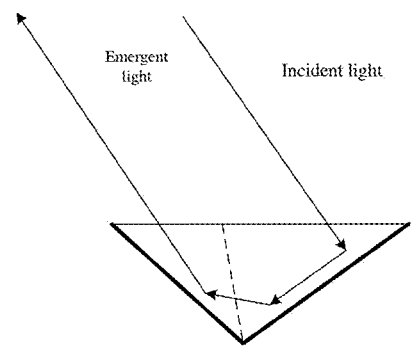
FIG. 22 is a retro-reflection principle diagram in the case where a triangular pyramid structure having an isosceles-triangular cross section provided by some embodiments of the present disclosure is a hollow concave structure.

For example, referring to FIG. 22, FIG. 22 is a schematic diagram of a light path of a triangular pyramid structure having an isosceles-triangular cross section; the triangular pyramid structure is a hollow concave structure; the incident light is incident on the retro-reflective element; because the triangular pyramid structure is a hollow concave structure, the incident light directly enters the inside of the triangular pyramid structure, is sequentially reflected by the three reflective surfaces of the triangular pyramid structure, and then is reflected out in a direction opposite to an incident direction of the incident light, so that the retro-reflective element allows light to be exited in the opposite direction of the incident direction of the incident light.

For example, the above-described triangular pyramid structure having an isosceles-triangular cross section may be, but is not limited to, a hollow concave structure; for example, a highly reflective layer is coated on the three reflective surfaces inside the triangular pyramid structure, to improve reflective efficiency of light. For example, referring to FIG. 21, it is a structural schematic diagram formed by regular permutation and combination of six of the above-described triangular pyramid structures; such a structure has high reflective efficiency with respect to incident light; and in the case where the incident light is perpendicular to a section of a triangular pyramid structure therein, reflective efficiency of light reaches the highest.

Figure 21:
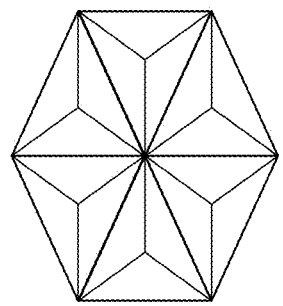
FIG. 21 is a structural schematic diagram formed by permutation and combination of triangular pyramid structures having an isosceles-triangular cross section provided by some embodiments of the present disclosure.

For example, the structure shown in FIG. 21 includes six of above-described triangular pyramid structures whose cross sections are isosceles triangles (non-right triangles). For example, as shown in FIG. 10, in the case where the above-described triangular pyramid structure whose cross section is an isosceles triangle (non-right triangle) is implemented as a structure with a solid center, surfaces of the six triangular pyramid structures that have a shape of an isosceles triangle (non-right triangle) are located on a same plane; and the surfaces of the six triangular pyramid structures that have a shape of an isosceles triangle (non-right triangle) are arranged into a hexagon. For example, in the case where the triangular pyramid structure whose cross section is an isosceles triangle (non-right triangle) is implemented as a hollow concave structure, for example, the six triangular pyramid structures whose cross sections are isosceles triangles (non-right triangles) are arranged in a similar manner, an no details will be repeated here.

For example, in the head-up display device according to some embodiments of the present disclosure, the reflective microstructure 3010 according to some embodiments of the present disclosure adopts a triangular pyramid structure having an isosceles-triangular cross section; a section of the triangular pyramid structure is an isosceles triangle, and three faces constituting the triangular pyramid structure are reflective surfaces.

Figure 23:
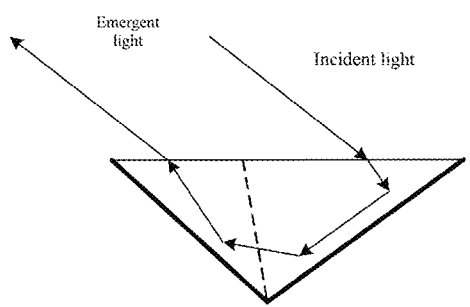
FIG. 23 is a retro-reflection principle diagram in the case where a triangular pyramid structure having an isosceles-triangular cross section provided by some embodiments of the present disclosure is a solid transparent structure.

For example, referring to FIG. 23, FIG. 23 is a schematic diagram of a light path of a triangular pyramid structure having an isosceles-triangular cross section; the triangular pyramid structure is a structure with a solid center, and a material of the structure with the solid center comprises a transparent material; incident light is incident on the retro-reflective element; because the triangular pyramid structure is a structure with a solid center, the incident light is refracted into the triangular pyramid structure, is sequentially reflected by the three reflective surfaces of the triangular pyramid structure, and finally is refracted out by the triangular pyramid structure; the light refracted out is exited in a direction opposite to an incident direction of the incident light, so that the retro-reflective element allows light to be exited in the opposite direction of the incident direction of the incident light.

For example, the above-described triangular pyramid structure having an isosceles-triangular cross section may be, but is not limited to, a solid transparent structure; for example, a highly reflective layer is coated on the three reflective surfaces of the solid transparent structure, to improve reflective efficiency of light.

Figure 13:
FIG. 13 is a retro-reflection principle diagram in the case where a cubic structure having a rectangular cross section provided by some embodiments of the present disclosure is a hollow concave structure.

For example, in the head-up display device according to some embodiments of the present disclosure, the reflective microstructure 3010 according to some embodiments of the present disclosure adopts a cubic structure having a rectangular cross section; the cubic structure includes three reflective surfaces perpendicular to each other; referring to FIG. 13, FIG. 13 is a schematic diagram of a light path of a cubic structure having a rectangular cross section; the cubic structure is a hollow concave structure; incident light is incident on the retro-reflective element; because the cubic structure is a hollow concave structure, the incident light directly enters the inside of the cubic structure, is sequentially reflected by the three reflective surfaces of the cubic structure, and then is exited in a direction opposite to an incident direction of the incident light, so that the retro-reflective element allows light to be exited in the direction opposite to the incident direction of the incident light. For example, the above-described cubic structure having a rectangular cross section may be, but is not limited to, a hollow concave structure; for example, a highly reflective layer is coated on the three reflective surfaces of the cubic structure, to improve reflective efficiency of light.

Figure 14:
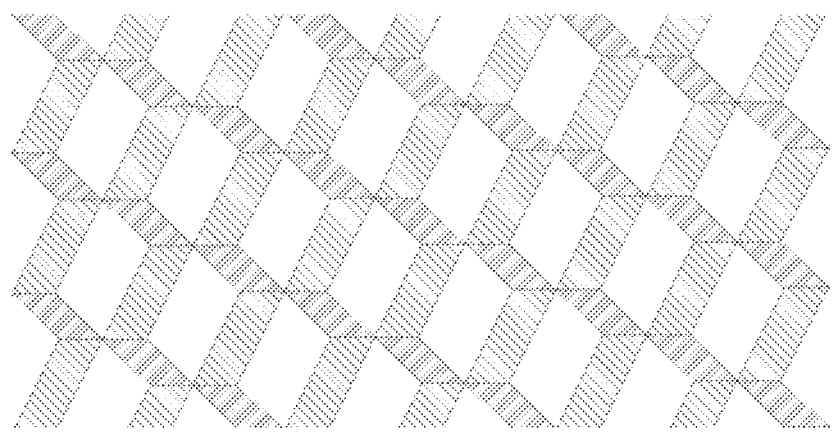
FIG. 14 is a structural schematic diagram formed by permutation and combination in the case where a cubic structure having a rectangular cross section provided by some embodiments of the present disclosure is a hollow concave structure.

For example, referring to FIG. 14, FIG. 14 is a top view of a structure formed by regular permutation and combination of a plurality of cubic structures; such a structure has high reflective efficiency with respect to incident light; and in the case where the incident light is perpendicular to the section of a cubic structure therein, reflective efficiency of light reaches the highest.

Figure 15:
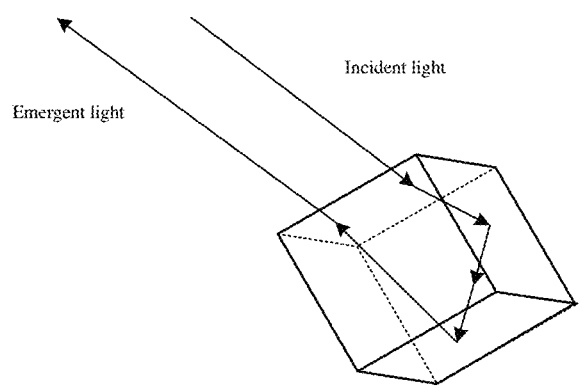
FIG. 15 is a retro-reflection principle diagram in the case where a cubic structure having a rectangular cross section provided by some embodiments of the present disclosure is a solid transparent structure.

For example, in the head-up display device according to some embodiments of the present disclosure, the reflective microstructure 3010 according to some embodiments of the present disclosure adopts a cubic structure having a rectangular cross section; the cubic structure includes three reflective surfaces perpendicular to each other; referring to FIG. 15, FIG. 15 is a schematic diagram of a light path of a cubic structure having a rectangular cross section; the cubic structure is a structure with a solid center, and a material of the structure with the solid center comprises a transparent material; incident light is incident on the retro-reflective element; because the cubic structure is a structure with a solid center, the incident light is refracted into the cubic structure, is sequentially reflected by the three reflective surfaces of the cubic structure, and finally is refracted out by the cubic structure; the light refracted out is exited in a direction opposite to an incident direction of the incident light, so that the retro-reflective element allows light to be exited in the opposite direction of the incident direction of the incident light. For example, the above-described cubic structure having a rectangular cross section may be, but is not limited to, a solid transparent structure; for example, a highly reflective layer is coated on the three reflective surfaces of the solid transparent structure, to improve reflective efficiency of light.

Figure 16:
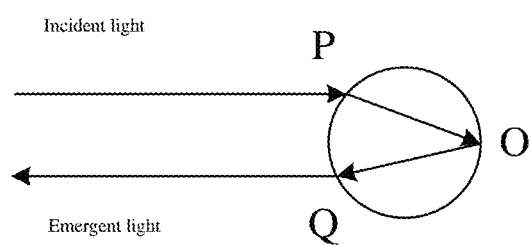
FIG. 16 is a retro-reflection principle diagram of a spherical structure provided by some embodiments of the present disclosure.

For example, in the head-up display device according to some embodiments of the present disclosure, a reflective layer is provided between the reflective microstructure 3010 and the substrate 3011; the reflective layer and the reflective microstructure 3010 are integrally formed, or the reflective layer and the substrate 3011 are integrally formed, or the reflective layer is separately present between the reflective microstructure 3010 and the substrate 3011; the reflective layer plays a role in efficiently reflecting out light incident into the spherical structure; for example, the reflective layer is a reflective layer having high reflectance; the reflectance of the reflective layer ranges from 50% to 95%. For example, the above-described reflective microstructure 3010 adopts a spherical structure; the spherical structure adopts a structure with a solid center, and a material of the structure with the solid center comprises a transparent material; referring to FIG. 16, FIG. 16 is a schematic diagram of a light path of a spherical structure; incident light is incident on the retro-reflective element; because the spherical structure is a structure with a solid center, the incident light is refracted into the spherical structure at point P on the spherical structure, is reflected by the reflective layer between the spherical structure and the substrate, specifically, reflected at focal point O; the reflected light finally passes through point O on the spherical structure and is refracted out; the refracted light is exited in a direction opposite to an incident direction of the original incident light so that the retro-reflective element allows light to be exited in the opposite direction of the incident direction of the incident light. Specifically, as to focal point O, the incident light will converge in a small region after being refracted into the spherical structure and then reflected, and the small region is just point O.

Hereinafter, an example of the retro-reflective element having a spherical structure will be exemplarily described.

For example, in the head-up display device according to some embodiments of the present disclosure, the microstructures adopting a spherical structure may be directly arranged on the substrate of the retro-reflective element; the microstructure adopting the spherical structure is directly in contact with the air; and there is no protective film above the microstructure, referring to FIG. 16, incident light directly passes through the microstructure; the incident light is refracted into the spherical structure at point P on the microstructure of the spherical structure, and is reflected by the reflective layer between the spherical structure and the substrate, specifically, reflected at focal point O; the reflected light is finally refracted out after passing through point Q on the spherical structure; the refracted light is exited in a direction opposite to an incident direction of the original incident light; the incident light is directly refracted by the spherical microstructure, focused and then reflected; the reflected light is exited in the opposite direction of the incident light, which results in least energy loss, and highest reflective intensity of light.

In some embodiments of the present disclosure, in order to improve reflective efficiency of light, a metal reflective layer is coated on an outer surface of the microstructure of the spherical structure; and the metal reflective layer can highly efficiently reflect light incident into the spherical structure at point O.

Hereinafter, another example of the retro-reflective element having a spherical structure will be exemplarily described in conjunction with FIG. 17.

For example, in the head-up display device according to some embodiments of the present disclosure, the retro-reflective element includes a substrate and a plurality of microstructures distributed on a surface of the substrate; in some embodiments of the present disclosure, the retro-reflective element includes a first substrate and a first convergent layer; the first convergent layer is arranged on the first substrate, wherein, the first convergent layer includes a reflective layer and a transparent material; the transparent material is arranged above the reflective layer; and the above-described plurality of microstructures are arranged inside the transparent material; the plurality of spherical microstructures arranged inside the transparent material are diffusing elements that uses the reflective layer to reflect the incident light in a direction opposite to an incident direction back to the top of the retro-reflective element.

Figure 17:
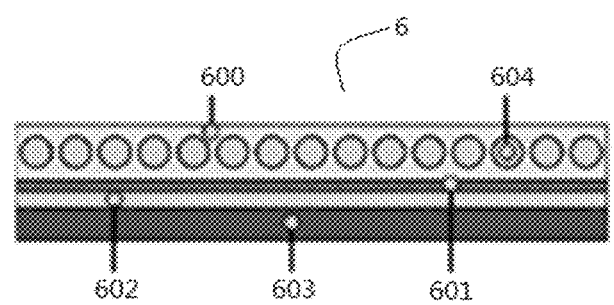
FIG. 17 is a schematic diagram of an embedded retro-reflective element provided by some embodiments of the present disclosure.

For example, referring to FIG. 17, in some embodiments of the present disclosure, the retro-reflective element 6 is provided with a transparent material 600, a reflective layer 601, and a first substrate along a light incident direction sequentially from top to bottom; the first substrate includes a back paper 603 and back glue 602 arranged above the back paper; the back glue is used for mounting; an upper surface of the back glue 602 is attached to the reflective layer 601; a plurality of first microstructures 604 adopting spherical structures are arranged inside the transparent material 600; light is incident on the first microstructure 604 and then will be transmitted through the first microstructure 604 to be incident on the reflective layer 601; the reflective layer 601 reflects the incident light back to the first microstructure 604; and the first microstructure 604 reflects the light back to the diffusing element in a direction opposite to an incident direction. In some embodiments of the present disclosure, the retro-reflective element 6 may also be referred to as an embedded retro-reflective element. For example, as compared with the first substrate, the transparent material 600 and the microstructure 604 are closer to the diffusing element.

For example, the above-described transparent material 600 is made of a transparent resin material. The microstructures adopting spherical structures are not uniform in size; the microstructures adopting spherical structures with different sizes are directly embedded in the transparent resin material; because sizes of the spherical structures are not completely uniform, distances between the spherical structures and the reflective layer 601 are not uniform; in the case where light passes through the spherical structure, it cannot guarantee a focal point of a spherical structure to exactly fall on the reflective layer behind, at this time, the reflected light cannot pass through the spherical structure again to return to the image source. For example, the above-described spherical structure is an elliptical spherical structure or a circular spherical structure.

Hereinafter, another example of the retro-reflective element having a spherical structure will be exemplarily described in conjunction with FIG. 18.

Figure 18:
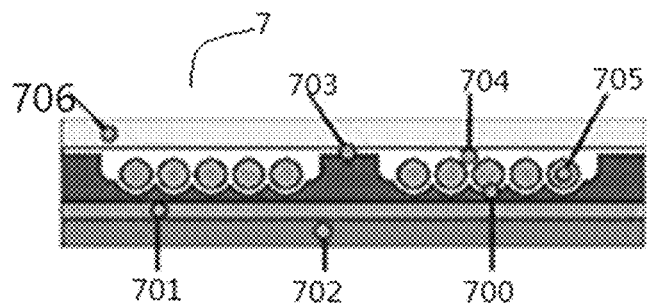
FIG. 18 is a schematic diagram of a sealed retro-reflective element provided by some embodiments of the present disclosure.

For example, in the head-up display device according to some embodiments of the present disclosure, the retro-reflective element includes a substrate and a plurality of microstructures distributed on a surface of the substrate; in some embodiments of the present disclosure, referring to FIG. 18, the retro-reflective element 7 according to some embodiments of the present disclosure includes a second substrate and a second convergent layer; the second convergent layer is arranged on the second substrate; the second substrate includes a back paper 702 and back glue 701 arranged on the back paper 702; the back glue 701 is attached to the second convergent layer; the second convergent layer includes a fixing layer 700 and a second microstructure 705; the second microstructure 705 is arranged on a surface of the fixing layer 700; and a side of the fixing layer 700 that is away from the second microstructure 705 is attached to the back glue 701; in some embodiments of the present disclosure, the microstructure adopts a microstructure having a reflective surface; for example, the reflective surface is a portion of a surface of the microstructure that reflects incident light; in some embodiments of the present disclosure, the retro-reflective element 7 may also be referred to as a sealed retro-reflective element.

For example, in some embodiments of the present disclosure, in order to protect the microstructure arranged in the second convergent layer, the retro-reflective element further includes a transparent cover layer 706; the transparent cover layer 706 is arranged on the second convergent layer; a first isolating layer 704 is formed in a gap between a side of the second microstructure 705 that is away from the fixing layer 700 and the transparent cover layer 706; a refractive index of the first isolating layer 704 is smaller than refractive indexes of the transparent cover layer, the fixing layer and the microstructure; in order to make the refractive index of the first isolating layer 704 smaller than the refractive indexes of the transparent cover layer, the fixing layer and the microstructure, for example, no medium is used in the first isolating layer, then the first isolating layer 704 has an air layer therein; for example, the first isolating layer is filled with aerogel with a refractive index very close to that of the air, which may also make the refractive index of the first isolating layer smaller than the refractive indexes of the transparent cover layer, the fixing layer and the microstructure. For example, as compared with the second substrate, the transparent cover layer 706 and the second microstructure 705 are closer to the diffusing element.

The above-described second convergent layer includes a fixing layer 700 and a second microstructure 705; the second microstructure 705 is arranged on a surface of the fixing layer 700; the fixing layer 700 has a plurality of concave portions; each concave portion in the plurality of concave portions may have at least one second microstructure 705 placed; in the fixing layer 700, in order to distinguish different concave portions, for example, the respective concave portions are spaced apart by a convex portion 703; and the convex portion 703 is used to support the transparent cover 706.

For example, in some embodiments of the present disclosure, the microstructure adopts a microstructure having a reflective surface; for example, a reflective material is directly coated on the spherical structure, so that a focal point is controlled to fall on an outer surface of the spherical structure, which ensures that light refracted from the spherical structure to an outer surface thereof may all return to the spherical structure. To this end, an effective refractive index can be guaranteed when light enters the spherical structure from the first isolating layer. For example, the reflective material is provided at least on a portion of the outer surface of the spherical structure that is closer to the concave portion. For example, in a direction perpendicular to the second substrate, the reflective material is at least located between the spherical structure and the concave portion. For example, the spherical structure is solid.

For example, the above-described fixing layer 700 is made of resin; and for example, the transparent cover layer 706 is made of transparent resin.

For example, the above-described spherical structure is an elliptical spherical structure or a circular spherical structure.

For example, the transflective device of the head-up display device provided by some embodiments of the present disclosure will be exemplified below.

For example, a surface of the transflective device is a free-form surface; the image source emits light for forming an image; the light is incident on the free-form surface of the transflective device; the free-form surface reflects the light incident thereon; the reflected light is incident on the retro-reflective element; the diffusing element emits the light incident thereon to the retro-reflective element; the retro-reflective element reflects the light incident thereon in a direction opposite to an incident direction; the reflected light reaches the diffusing element again; the diffusing element diffuses the light incident thereon to form a beam of a certain shape; and the formed beam of a certain shape reaches the free-form surface of the transflective device and is reflected again, finally forming a virtual image.

For another example, the surface of the transflective device is a flat surface; the image source emits light for forming an image; the light is incident on the flat surface of the transflective device; the flat surface reflects the light incident thereon; the reflected light is incident on the light control device; the diffusing element emits the light incident thereon to the retro-reflective element; the retro-reflective element reflects the light incident thereon in a direction opposite to an incident direction; the reflected light reaches the diffusing element again, and the diffusing element diffuses the light incident thereon to form a beam of a certain shape; and the formed beam of a certain shape reaches the flat surface of the transflective device and is reflected again, finally forming a virtual image.

For example, the head-up display device provided by some embodiments of the present disclosure will be exemplarily described below in conjunction with FIG. 19.

In the case where the head-up display device provided by some embodiments of the present disclosure is used in a transportation tool having a windshield, referring to FIG. 19, the image source 1 adopts a projecting device; the transflective device 2 adopts a windshield of a transportation tool; the windshield is provided thereon with a transflective film; the transflective film is used to improve reflectance and transmittance of light; wherein, a positional relationship among the projecting device, the windshield in the transportation tool, and the light control device is that: a side of the projecting device that projects light faces the windshield of the transportation tool, the light control device is arranged below the windshield of the transportation tool, for example, a surface of a dashboard of the transportation tool; specifically, the projecting device is arranged on the top of the transportation tool when used in the transportation tool having a windshield, a side of the projecting device that emits light faces a front windshield of the transportation tool, and the light control device is arranged below the transflective device.

The light control device 3 includes a retro-reflective element 301 and a diffusing element 300; the diffusing element 300 is arranged above the retro-reflective element 301; light incident on the light control device 3 firstly reaches the diffusing element 300, then passes through the diffusing element 300, and then reaches the retro-reflective element 301; the retro-reflective element 301 is configured to reflect the light incident thereon in a direction opposite to an incident direction; the diffusing element 300 is configured to diffuse the light incident thereon, and the light is diffused by the diffusing element to form a beam of a certain shape (a dashed line in the diagram represents the diffused beam).

In the case where the head-up display device is operating, the projecting device emits light for forming an image; the light is incident on the windshield and is subjected for a first reflection by the windshield (the first reflection refers to reflection for a first time relative to the windshield per se); the reflected light reaches the light control device; and the light that reaches the light control device firstly reaches the diffusing element 300, passes through the diffusing element 300, and then is incident on the retro-reflective element; the retro-reflective element allows the light incident thereon to be exited in a direction opposite to an incident direction; the emergent light reaches the above diffusing element 300 again; the diffusing element 300 diffuses the light incident thereon to form a beam having a certain shape; the beam having a certain shape reaches the windshield; the beam incident on the windshield is subjected to a second reflection by the windshield (the second reflection refers to reflection for a second time relative to the windshield per se) to form a virtual image, the reflected light is incident into a preset region; and a driver may observe large-sized image information within an eye box during driving.

The above-described projecting device includes a projecting light source, an image generating unit, and a lens portion; the projecting light source emits light, which is converted into image light by the image generating unit; the image light is then emergent through the lens portion to form projection light; the projecting device includes a liquid crystal display (LCD) projecting device and a Digital Light Processing (DLP) device; the projecting light source emits light, and is for example a gas discharge light source, including an ultra-high pressure mercury lamp, a short-arc xenon lamp, and a metal halide lamp; the projecting light source is for example an electroluminescent light source, for example, a Light Emitting Diode (LED) light source; the projecting light source is for example a laser light source; the image generating unit converts light into image light, and, for example, specifically be a Liquid Crystal Display (LCD) or a Digital Micromirror Device (DMD). The lens portion emits projection light; image light passes through the lens portion and then forms projection light, and the projection light is projected on a screen to form a real image. The lens portion includes a convex lens or an equivalent lens group that functions similarly to the convex lens, for example, a combination of a convex lens, a concave lens, and a Fresnel lens. For example, the projecting device is specifically a wide-angle or ultra-wide-angle projecting device, which may project a large-sized image; and combined with a large-sized light control device, the head-up display device may display a large-sized image.

For example, the head-up display device provided by some embodiments of the present disclosure will be exemplarily described below in conjunction with FIG. 20.

In the case where the head-up display device provided by some embodiments of the present disclosure is used in a transportation tool having a windshield, referring to FIG. 20, the image source 1 adopts a projecting device; the transflective device 2 adopts a windshield of a transportation tool; the windshield is provided thereon with a transflective film; the transflective film is used to improve reflectance and transmittance of light; wherein, a positional relationship among the projecting device, the windshield in the transportation tool, and the light control device is that: a side of the projecting device that projects light faces the windshield of the transportation tool, the light control device is arranged below the windshield of the transportation tool, for example, a surface of a dashboard of the transportation tool; specifically, the projecting device is arranged on the top of the transportation tool when used in the transportation tool having a windshield, a side of the projecting device that emits light faces a front windshield of the transportation tool, and the light control device is arranged below the transflective device.

The light control device 3 includes a retro-reflective element 301 and a diffusing element 300; the diffusing element 300 is arranged above the retro-reflective element 301; light incident on the light control device 3 firstly reaches the diffusing element 300, then passes through the diffusing element 300, and then reaches the retro-reflective element 301; the retro-reflective element 301 is configured to reflect the light incident thereon in a direction opposite to an incident direction; the diffusing element 300 is configured to diffuse the light incident thereon, and the light is diffused by the diffusing element to form two beams of a certain shape (a dashed line in the diagram represents the light of the diffused two beam).

A specific light path is as shown in FIG. 24; a multi-beam diffusing element is used; the multi-beam diffusing element can diffuse light incident thereon into two beams having a certain shape; the multi-beam diffusing element includes a light diffusing layer 3000 and a light orientating layer 3001; the light orientating layer 3001 is configured to emit light in a plurality of different directions, and the light diffusing layer 3000 is configured to diffuse light from a plurality of different directions into a plurality of beams.

Firstly, the projecting device emits light for forming an image; the light reaches the windshield and is reflected by the windshield; the reflected light A reflected by the windshield or the transflective device reaches the multi-beam diffusing element; the reflected light A passing through the multi-beam diffusing element becomes approximately vertical light B (for example, perpendicular to the substrate of the retro-reflective element 301 or perpendicular to an arrangement surface of the microstructure of the retro-reflective element 301); the light B is incident on the retro-reflective element and is allowed to be emitted by the retro-reflective element in a direction opposite to an incident direction of the incident light (here, the incident light refers to the light B); emergent light C is still approximately vertical; the emergent light C is incident from the light orientating layer, passes through the light orientating layer and the light diffusing layer; and finally the light emitted from the multi-beam diffusing element is separated into two beams, whose main optical axes are respectively D and E, the beam with the main chief light (optical axis) D is reflected by the windshield and then covers the eye box, and the beam with the main chief light E is reflected by the windshield and then covers the projecting device; specifically referring to FIG. 20, the multi-beam diffusing element according to some embodiments of the present disclosure is used, the multi-beam diffusing element may diffuse and form two beams, one of which may cover the eye box after being reflected, and the other may cover the projecting device after being reflected; based on the above-described embodiment, when the multi-beam diffusing element is used, a position of the projecting device is further limited below: a direction of the main chief light E of the beam diffused by the multi-beam diffusing element is parallel to a direction of the above-described reflected light A, and the main chief light of the light reflected by the windshield is parallel to the light emitted by the projecting device. As compared with the embodiment of diffusing a single beam, when the multi-beam diffusing element is used, the light will not be incident to a position between the projecting device and the eye box, which may further improve light efficiency; for example, the above-described embodiment implement large-sized full-window HUD displaying.

In the case where the head-up display device is operating, the projecting device emits light for forming an image; the light is incident on the windshield and is subject to a first reflection by the windshield (the first reflection refers to reflection for a first time relative to the windshield per se); the reflected light reaches the light control device; and the light that reaches the light control device firstly reaches the diffusing element 300, passes through the diffusing element 300, and then is incident on the retro-reflective element; the retro-reflective element allows the light incident thereon emergent in a direction opposite to an incident direction; the emergent light reaches the above diffusing element 300 again; the diffusing element 300 diffuses the light incident thereon to form two beams having a certain shape; the beams having a certain shape reach the windshield; the beams incident on the windshield are subjected to a second reflection by the windshield (the second reflection refers to reflection for a second time relative to the windshield per se) to form a virtual image, and the reflected light is incidented into two regions, one of which is a preset region; and a driver may observe large-sized image information within an eye box during driving. The device can efficiently utilize projection light, can form a large FOV image outside the windshield, and can form a large-sized, high-definition, high-brightness image with low power consumption, which greatly improves the HUD experience.

The above-described projecting device includes a projecting light source, a mage generating unit, and a lens portion; the projecting light source emits light, which is converted into image light by the image generating unit; the image light then passes through the lens portion and is exited from the lens portion to form projection light; the projecting device includes an LCD projecting device and a DLP device; the projecting light source emits light, and is a gas discharge light source, including an ultra-high pressure mercury lamp, a short-arc xenon lamp, and a metal halide lamp; the projecting light source is an electroluminescent light source, for example, an Light Emitting Diode (LED) light source; the projecting light source is a laser light source; the image generating unit converts light into image light, and, for example, is an Liquid Crystal Display (LCD) or a Digital Micromirror Device (DMD). The lens portion emits projection light; the image light passes through the lens portion to form projection light, and the projection light may form a real image after being projected on a screen. The lens portion includes a convex lens or an equivalent lens group that functions similarly to the convex lens, for example, a combination of a convex lens, a concave lens and a Fresnel lens.

For example, with respect to the head-up display device according to some embodiments of the present disclosure, when the reflective microstructure 3010 in the retro-reflective element 301 adopts a spatial structure composed of three faces perpendicular to each other pairwise, and the spatial structure is a structure with a solid center, and a material of the structure with the solid center comprises a transparent material; or when the reflective microstructure 3010 in the retro-reflective element 301 is a spherical microstructure and the spherical microstructure is a structure with a solid center, and a material of the structure with the solid center comprises a transparent material, the retro-reflective element 301 needs to be designed accordingly.

One example of the retro-reflective element 301 provided by some embodiments of the present disclosure will be exemplarily described below in conjunction with FIG. 25 and FIG. 26.

Figure 25:
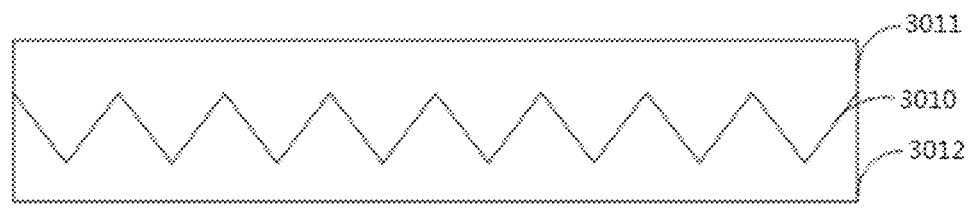
FIG. 25 is a structural schematic diagram of a retro-reflective element having a reflective microstructure provided by some embodiments of the present disclosure.

For example, referring to FIG. 25, the retro-reflective element 301 includes a substrate 3011 and a plurality of reflective microstructures 3010 distributed on a surface of the substrate 3011; the plurality of reflective microstructures 3010 are evenly distributed on the surface of the substrate 3011; the reflective microstructures 3010 may reflect the light incident thereon in a direction opposite to an incident direction; a concave portion is formed between the plurality of reflective microstructures 3010; a filler 3012 is provided in the concave portion; the above-described filler 3012 serves as a support; in the case where the retro-reflective element 301 provided with the filler 3012 is connected with an external element, it may ensure the reflective microstructure 3010 in the retro-reflective element 301 not to be damaged by compression, so that the retro-reflective element having the reflective microstructure has expandability in application. For example, the filler 3012 is made of materials below: rubber filler, plastic filler, polymer filler, or others.

In an example, the above-described reflective microstructure 3010 per se has a reflective surface; and the reflective surface allows the reflective microstructure 3010 to reflect light incident thereon in a direction opposite to an incident direction. For example, the reflective surface of the above-described reflective microstructure 3010 per se refers to a surface where the reflective microstructure 3010 is in contact with the filler 3012, that is, the reflective surface of the reflective microstructure 3010 per se refers to an interface between the reflective microstructure 3010 and the filler 3012.

Figure 26:
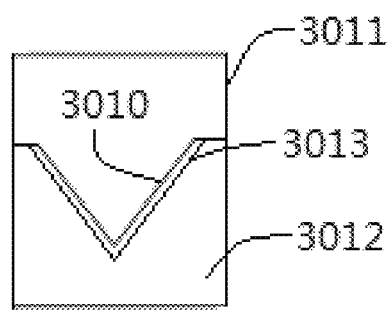
FIG. 26 is a structural schematic enlarged view of a reflective microstructure having a reflective layer arranged on a reflective surface provided by some embodiments of the present disclosure.

In another example, referring to FIG. 26, a reflective layer 3013 is provided on the reflective surface of the reflective microstructure 3010; the reflective layer 3013 is located between the reflective microstructure 3010 and the filler 3012; the reflective layer 3013 has higher reflectance with respect to light; in the case where light is incident on the retro-reflective element 301, the light is efficiently reflected after reaching the reflective layer 3013, so that the retro-reflective element 301 has high reflectance with respect to the light.

For example, the reflective layer 3013 on the reflective surface of the reflective microstructure 3010 has high reflectance with respect to light; for example, the reflectance of the reflective layer 3013 is up to 60%, 70%, 80%, 90%, or more.

For example, the reflectance of the reflective layer 3013 with respect to light may even reaches 95%.

One example of the reflective layer 3013 provided by some embodiments of the present disclosure will be exemplarily described below in conjunction with FIG. 27.

For example, in the head-up display device according to some embodiments of the present disclosure, referring to FIG. 26, a reflective layer 3013 is provided on the reflective surface of the reflective microstructure 3010; and the reflective layer 3013 is located between the reflective microstructure 3010 and the filler 3012; the reflective layer 3013 has high reflectance with respect to light; in the case where light is incident on the retro-reflective element 301, the light reaches the reflective layer 3013 and is efficiently reflected, so that the retro-reflective element 301 has high reflectance with respect to the light.

A specific implementation mode of the reflective layer 3013 according to some embodiments of the present disclosure is that: the reflective layer 3013 is formed by stacking films; respective films have a refractive index property; the reflective layer 3013 includes at least some of the stacked films; refractive indexes between adjacent films in the part of stacked films present a high and low distribution pattern, and the part of stacked films include at least a pair of adjacent films whose refractive indexes present a high and low distribution pattern.

Figure 27:
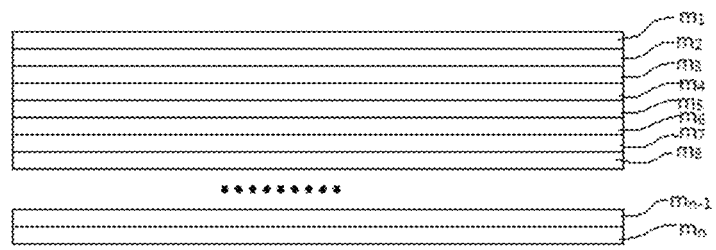
FIG. 27 is a structural schematic diagram of films being stacked provided by some embodiments of the present disclosure.

For example, referring to FIG. 27, the reflective layer 3013 is formed by stacking films; along an incident direction of light, all stacked films sequentially include a first film $m_1$, a second film $m_2$, a third film $m_3$, a fourth film $m_4$, ... an (n−1)th film $m_{n-1}$ and nth film $m_n$, the reflective layer 3013 includes at least some of the stacked films; these stacked films are only a part of all the stacked films; refractive indexes between adjacent films in the part of stacked films present a high and low distribution pattern, and the part of stacked films include at least a pair of adjacent films whose refractive indexes present a high and low distribution pattern. Therefore, in the n-layer stacked films, there are some stacked films, of which adjacent films have refractive indexes distributed in a high and low pattern; the part of stacked films may include 5 pairs of adjacent films whose refractive indexes present a high and low distribution pattern (in the part of stacked films, the number of pairs of adjacent films whose refractive indexes present a high and low distribution pattern may be, but is not limited to 5), the 5 pairs of adjacent films whose refractive indexes present a high and low distribution pattern may be: an (n−10)th film $m_{n-10}$ to an (n−1)th film $m_{n-1}$, where, a refractive index of the (n−10)th film $m_{n-10}$ is higher than a refractive index of an (n−9)th film $m_{n-9}$, a refractive index of an (n−8)th film $m_{n-8}$ is higher than a refractive index of an (n−7)th film $m_{n-7}$, a refractive index of an (n−6)th film $m_{n-6}$ is higher than a refractive index of an (n−5)th film $m_{n-5}$, a refractive index of an (n−4)th film $m_{n-4}$ is higher than a refractive index of an (n−3)th film $m_{n-3}$, and a refractive index of an (n−2)th film $m_{n-2}$ is higher than a refractive index of an (n−1)th film $m_{n-1}$ (positions of the part of stacked films in all the stacked films may be, but are not limited thereto). In practical application, the larger the number of pairs of adjacent films whose refractive indexes present a high and low distribution pattern in the part of stacked films, the higher the final reflectance of the reflective layer 3013 with respect to light, and the higher the reflectance of the optical element with respect to light. The number of pairs of adjacent films whose refractive indexes present a high and low distribution pattern in the part of stacked films may be, but is not limited to 50; the number of pairs of adjacent films whose refractive indexes presents a high and low distribution pattern in the part of stacked films may range from 5 to 100; in the case where the number of pairs of adjacent films whose refractive indexes present a high and low distribution pattern in the part of stacked films ranges from 20 to 30, the reflective layer has high reflective efficiency with respect to light so that the optical element has extremely high reflective efficiency with respect to light.

The above-described reflective layer 3013 is formed by stacking film films, and refractive indexes of the films have no less than two types. In the case where the refractive indexes in the reflective layer 3013 include two types, the refractive index of the (n−10)th film $m_{n-10}$, the refractive index of the (n−8)th film $m_{n-8}$, the refractive index of the (n−6)th film $m_{n-6}$, the refractive index of the (n−4)th film $m_{n-4}$, and the refractive index of the (n−2)th film $m_{n-2}$ are all the same; the refractive index of the (n−9)th film $m_{n-9}$, the refractive index of the (n−7)th film $m_{n-7}$, the refractive index of the (n−5)th film $m_{n-5}$, the refractive index of the (n−3)th film $m_{n-3}$, and the refractive index of the (n−1)th film $m_{n-1}$ are all the same; and the refractive index of the (n−10)th film $m_{n-10}$ is unequal to the refractive index of the (n−9)th film $m_{n-9}$.

In the case where the refractive indexes in the reflective layer 3013 have more than two types, it is to satisfy conditions below: from to the (n−10)th film $m_{n-10}$ to the (n−1)th film $m_{n-1}$, the refractive index of the (n−10)th film $m_{n-10}$ is higher than the refractive index of the (n−9)th film $m_{n-9}$, the refractive index of the (n−8)th film $m_{n-8}$ is higher than the refractive index of the (n−7)th film $m_{n-7}$, the refractive index of the (n−6)th film $m_{n-6}$ is higher than the refractive index of the (n−5)th film $m_{n-5}$, the refractive index of the (n−4)th film $m_{n-4}$ is higher than the refractive index of the (n−3)th film $m_{n-3}$, and the refractive index of the (n−2)th film $m_{n-2}$ is higher than the refractive index of the (n−1)th film $m_{n-1}$; the refractive index of the (n−10)th film $m_{n-10}$, the refractive index of the (n−8)th film $m_{n-8}$, the refractive index of the (n−6)th film $m_{n-6}$, the refractive index of the (n−4)th film $m_{n-4}$, and the refractive index of the (n−2)th film $m_{n-2}$ may be different; and the refractive index of the (n−9)th film $m_{n-9}$, the refractive index of the (n−7)th film $m_{n-7}$, the refractive index of the (n−5)th film $m_{n-5}$, the refractive index of the (n−3)th film $m_{n-3}$, and the refractive index of the (n−1)th film $m_{n-1}$ may be different.

For example, thicknesses of the above-described films range from 50 nm to 190 nm, and the thicknesses of the films are not limited to the range.

The above-described reflective microstructure 3010 is made of a transparent material (with respect to light incident on the retro-reflective element 301); and refractive indexes of the transparent materials of the reflective microstructures 3010 are all larger than 1, that is, the refractive indexes of the reflective microstructures 3010 are larger than 1.

In some embodiments of the present disclosure, the reflective layer 3013 is connected with the reflective surface of the reflective microstructure 3010 in a form of coating. The respective films in the reflective layer 3013 are in a stacked connection by bonding, vapor deposition, electroplating, sputtering, or deposition, or the like In some embodiments of the present disclosure, the reflective layer 3013 is formed by stacking films with different refractive indexes; and refractive indexes between adjacent films are distributed in a high and low pattern. The above-described films whose refractive indexes are distributed in a high and low pattern are made of materials below.

For example, the film having the high refractive index may be, but is not limited to: a strontium titanate film, a chromium oxide film, a copper oxide film, a titanium dioxide (rutile type) film, a titanium dioxide (anatase type) film, an amorphous selenium film, a zinc oxide film, a gallium nitride film, an iodine crystal film, an amorphous silicon film, a monocrystalline silicon film, a titanium pentoxide film, a zirconium dioxide film, a tantalum pentoxide film, or a niobium pentoxide film. For example, the film having low refractive indexes may be but is not limited to: a silicon dioxide film or a magnesium fluoride film.

Through the films with high refractive indexes and the films with low refractive indexes according to some embodiments of the present disclosure, for example, high reflectance of the reflective layer with respect to light is implemented, thereby implementing high reflectance of the retro-reflective element with respect to light.

In an example, refractive indexes between all adjacent films in the reflective layer 3010 present a high and low distribution pattern, that is, the refractive index of the 1st film $m_1$ is higher than the refractive index of the $2_{nd}$ film $m_2$, the refractive index of the 3rd film $m_3$ is higher than the refractive index of the 4th film $m_4$, the refractive index of the 5th film $m_5$ is higher than the refractive index of the 6th film $m_6$, and so on, the refractive index of the (n−1)th film $m_{n-1}$ is higher than the refractive index of the nth film $m_n$.

In the above-described reflective layer 3013, refractive indexes between all adjacent films present a high and low distribution pattern; in some embodiments of the present disclosure, the reflective layer 3013 includes two types of refractive indexes, one of which is higher than the other. That is, the refractive index of the 1st film $m_1$, the refractive index of the 3rd film $m_3$, the refractive index of the 5th film $m_5$, . . . are all the same, the refractive index of the $2_{nd}$ film $m_2$, the refractive index of the 4th film $m_4$, the refractive index of the 6th film $m_6$, . . . are all the same, the refractive index of the 1st film $m_1$ is higher than the refractive index of the $2_{nd}$ film $m_2$. That is, the reflective layer 3013 is composed of films with two different types of refractive indexes repeatedly stacked in an order of high and low refractive indexes. The reflective layer 3013 of the above-described example has high reflectance with respect to light, so the retro-reflective element 301 has high reflectance with respect to light.

For example, the number of layers of the above-described films is not less than 2; accordingly, the large the number of films, the higher the reflectance of the reflective layer 3013, and the higher the reflectance of the retro-reflective element, so that the retro-reflective element has high reflectance with respect to light.

It is to be noted that, the reflective layer 3013 provided by some embodiments of the present disclosure is not limited to being implemented as a multi-layer dielectric film; according to actual application needs, for example, the reflective layer 3013 provided on the reflective surface of the reflective microstructure 3010 is a metal reflective layer; the metal reflective layer has high reflective efficiency with respect to light; for example, the metal reflective layer is an aluminum metal reflective layer or a silver metal reflective layer or others; and for example, the metal reflective layer is connected with the reflective surface of the reflective microstructure 3010 through plating, which is not limited thereto.

For example, the refractive index of the reflective layer 3013 provided on the reflective surface of the reflective microstructure 3010 is designed to be lower than the refractive index of the reflective microstructure 3010 per se, and the lower value (i.e., a difference between the refractive index of the reflective microstructure 3010 and the refractive index of the reflective layer 3013) is not smaller than 0.15; the reflective microstructure 3010 is made of a transparent material, and the refractive index of the transparent material is larger than 1, then the refractive index of the reflective microstructure 3010 is larger than 1 so that reflective efficiency of the reflective layer 3013 and the retro-reflective element 301 with respect to light is high.

For example, because the refractive index of the reflective layer 3013 is lower than the refractive index of the reflective microstructure 3010 when light is incident from a side of the reflective microstructure 3010, it is emitted from an optically dense medium toward an optically sparse medium, and for example, a portion of the light incident thereon is totally reflected, which further improves reflective efficiency.

For example, the reflective microstructure per se is made of a transparent material; the transparent material is a polymer transparent material, glass, or others; a refractive index of the transparent material is larger than 1; accordingly, for example, the reflective layer 3013 provided on the reflective surface of the reflective microstructure is made of respective materials in Table 1, as long as the refractive index thereof is lower than the refractive index of the reflective microstructure 3010 per se and the lower value is not smaller than 0.15; a material of the reflective layer provided on the reflective surface of the reflective microstructure may be, but not limited to, respective materials in Table 2.

TABLE 2

| Material name (molecular formula) | Refractive index |
| --- | --- |
| Agate SiO$_2$ | 1.544 to 1.553 |
| Albite Na$_2$O•Al$_2$O$_3$•6SiO$_2$ | 1.529 |
| Albite (Feldspar) NaAlSi$_3$O$_8$ | 1.527 to 1.538 |
| Almandine (Garnet) | 1.830 |
| Alumina Al$_2$O$_3$ | 1.760 |
| Alumina trihydrate Al$_2$O$_3$•3H$_2$O | 1.577 to 1.595 |
| Aluminium Hydroxide Al(OH)$_2$ | 1.56 to 1.75 |
| (Nat. Boehmite) AlO(OH) | 1.64 to 1.67 |
| Aluminium Oxide Al$_2$O$_3$ | 1.76 to 1.768 |
| (Corundum) | 1.765 |
| Aluminium Silicate Al$_2$O$_3$•SiO$_2$ | 1.65 |
| Anatase (Titanium Dioxide) TiO$_2$ | 2.49 to 2.56 |
| Andesine (Feldspar) ([NaSi]0.7-0.5 [CaAl]0.3-0.5)AlSi$_2$O$_8$ | 1.544 to 1.563 |
| Anorthite (Feldspar) CaAl$_2$Si$_2$O$_8$ | 1.577 to 1.590 |
| Anorthoclase (Feldspar) (Na, K)AlSi$_3$O$_8$ | 1.523 to 1.529 |
| Aragonite (Calcium Carbonate) CaCO$_3$ | 1.530 to 1.686 |
| Arsenic Sulphur Glass | 2.61 |

The reflective microstructure 3010 in the retro-reflective element 301 will be exemplarily described below.

For example, in the head-up display device according to some embodiments of the present disclosure, in the case where the reflective microstructure 3010 in the retro-reflective element 301 adopts a spatial structure composed of three faces perpendicular to each other pairwise, and the spatial structure is a structure with a solid center, and a material of the structure with the solid center comprises a transparent material, the reflective microstructure 3010 may be, but is not limited to, a spatial structure composed of three faces perpendicular to each other pairwise, the three faces are all reflective surfaces, and the spatial structure composed of three faces perpendicular to each other pairwise is a structure with a solid center, and a material of the structure with the solid center comprises a transparent material.

For example, the spatial structure composed of three faces perpendicular to each other pairwise may include, but is not limited to, a triangular pyramid structure having an equilateral-triangular cross section or a triangular pyramid structure having an isosceles-triangular cross section or a cubic structure having a rectangular cross section.

For example, FIG. 12 may be referred to for the triangular pyramid structure having an equilateral-triangular cross section; in FIG. 12, when the incident light is incident on the retro-reflective element, the incident light is refracted into the triangular pyramid structure having an equilateral-triangular cross section, subjected to three reflections on the reflective surface inside the triangular pyramid structure having an equilateral-triangular cross section, and then is refracted out of the triangular pyramid structure; and the refracted light is in an opposite direction of the incident light.

For example, FIG. 23 may be referred to for the triangular pyramid structure having an isosceles-triangular cross section; in FIG. 23, when the incident light is incident on the retro-reflective element, the incident light is refracted into the triangular pyramid structure having an isosceles-triangular cross section, subjected to three reflections on the reflective surface inside the triangular pyramid structure having an isosceles-triangular cross section, and then is refracted out of the triangular pyramid structure; and the refracted light is in a direction opposite to the incident light.

For example, FIG. 15 may be referred to for the cubic structure having a rectangular cross section; in FIG. 15, in the case where incident light is incident on the retro-reflective element, the incident light is refracted into the cubic structure having a rectangular cross section, subjected to three reflections on the reflective surface inside the cubic structure having a rectangular cross section, and then is refracted out of the cubic structure having a rectangular cross section; and the refracted light is in an opposite direction of the incident light.

For example, in the head-up display device according to some embodiments of the present disclosure, in the case where the reflective microstructure 3010 in the retro-reflective element 301 adopts a spherical microstructure and the spherical microstructure is a structure with a solid center, and a material of the structure with the solid center comprises a transparent material, the spherical microstructure per se has a reflective layer; and reflectance of the reflective layer is as high as 95%. FIG. 16 may be referred to for the spherical microstructure; in the case where light is incident on the retro-reflective element, the light is refracted into the spherical microstructure at point P on the spherical microstructure, and reflected at point O inside the spherical microstructure; the reflected light reaches point Q on the spherical microstructure, refracted again; and the refracted light is in an opposite direction of the incident light.

Figure 28:
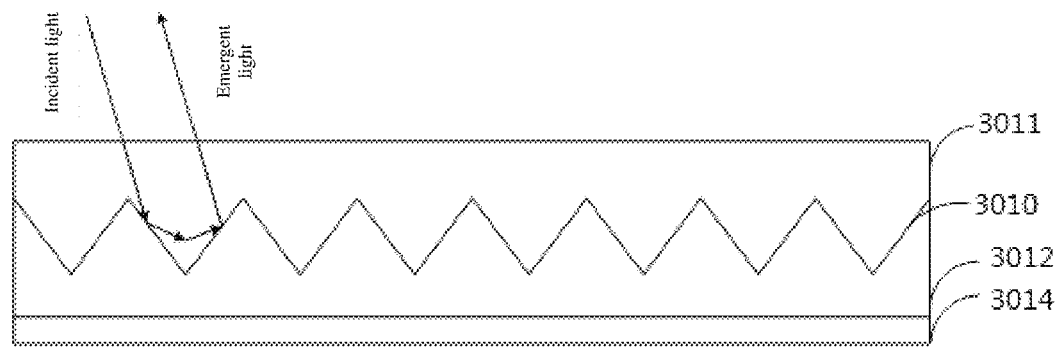
FIG. 28 is a schematic diagram of a retro-reflective element being arranged on an external support element provided by some embodiments of the present disclosure.

For example, with respect to a head-up display device according to some embodiments of the present disclosure, in practical application, the retro-reflective element is provided on an external support element part, specifically, the filler is provided on the external support element 3014, as shown in FIG. 28, in the case where light is incident on the retro-reflective element, retro-reflection occurs. It should be understood that, because the substrate 3011 and the reflective microstructures 3010 distributed on the surface of the substrate 3011 have a refractive index larger than 1, the light should be refracted into and refracted out of the substrate 3011 with the reflective microstructures; for convenience of illustration, the diagram does not show the refraction process, but only schematically shows the process that light is subjected to one or more reflections on the reflective microstructure 3010, and the reflected light is emitted in an opposite direction of the incident light.

Figure 29:
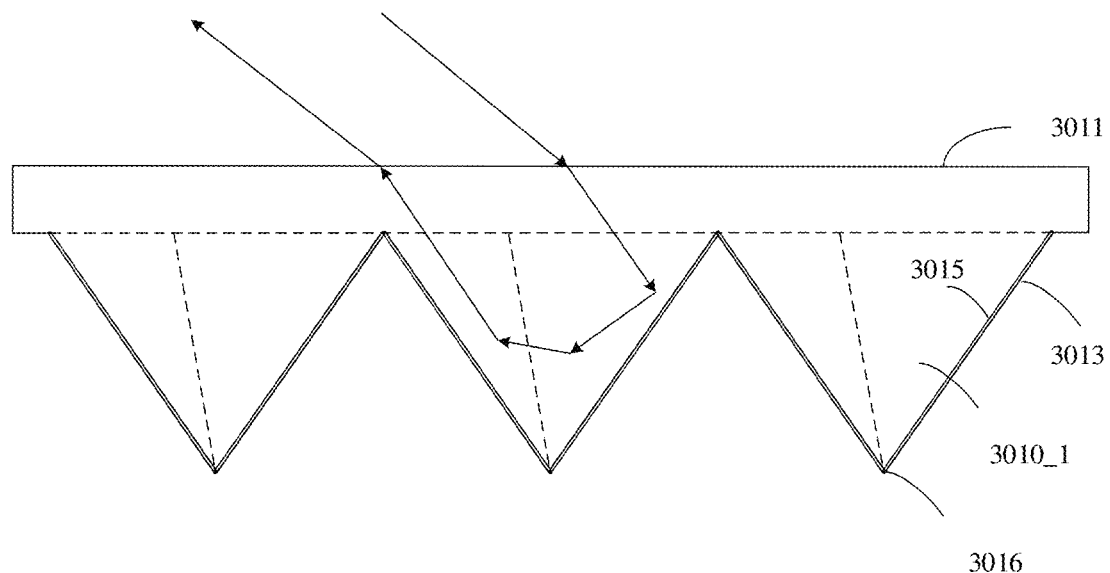
FIG. 29 is a structural schematic diagram of a retro-reflective element provided by some embodiments of the present disclosure.

FIG. 29 is a structural schematic diagram of a retro-reflective element provided by some embodiments of the present disclosure. For example, as shown in FIG. 29, the retro-reflective element 301 includes a substrate 3011, a plurality of reflective microstructures 3010 (solid reflective microstructures 3010_1) distributed on a surface of the substrate 3011 and a reflective layer 3013; the reflective microstructures 3010 (the solid reflective microstructures 3010_1) are located on a side of the substrate 3011 that is away from the diffusing element 300; a reflective layer 3013 is provided on a reflective surface 3015 of the reflective microstructure 3010 (the solid reflective microstructure 3010_1), that is, the reflective layer 3013 is for example provided on a surface of a side of the reflective microstructure 3010 (the solid reflective microstructure 3010_1) that is away from the substrate 3011. For example, the substrate 3011 and the plurality of reflective microstructures 3010 shown in FIG. 9 may be integrally formed; for example, there is no interface between the substrate 3011 and the reflective microstructure 3010; for example, the substrate 3011 and the reflective microstructure 3010 are formed in a same fabrication process.

Figure 30:
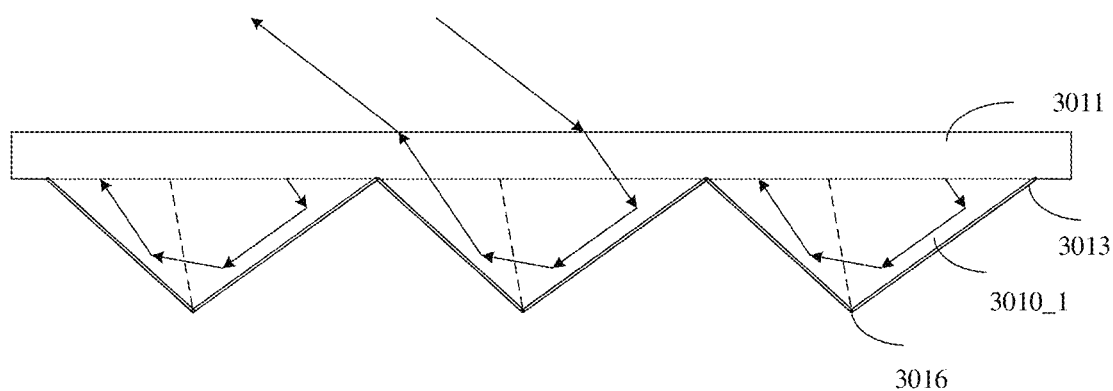
FIG. 30 is a structural schematic diagram of another retro-reflective element provided by some embodiments of the present disclosure.

FIG. 30 is a structural schematic diagram of another retro-reflective element provided by some embodiments of the present disclosure. The retro-reflective element shown in FIG. 30 is similar to the retro-reflective element shown in FIG. 29; a difference between the retro-reflective element shown in FIG. 30 and the retro-reflective element shown in FIG. 29 includes: the reflective microstructure 3010 included in the retro-reflective element shown in FIG. 30 is a solid triangular pyramid structure having an isosceles-triangular (non-right-triangular) cross section, while the reflective microstructure 3010 included in the retro-reflective element shown in FIG. 29 is a solid triangular pyramid structure having an equilateral-triangular cross section.

Figure 31:
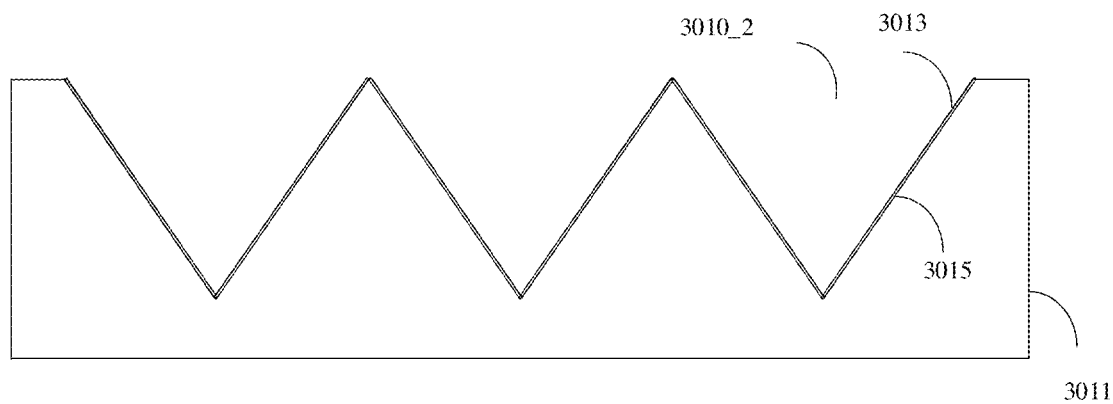
FIG. 31 is a structural schematic diagram of a further retro-reflective element provided by some embodiments of the present disclosure.
Figure 32:
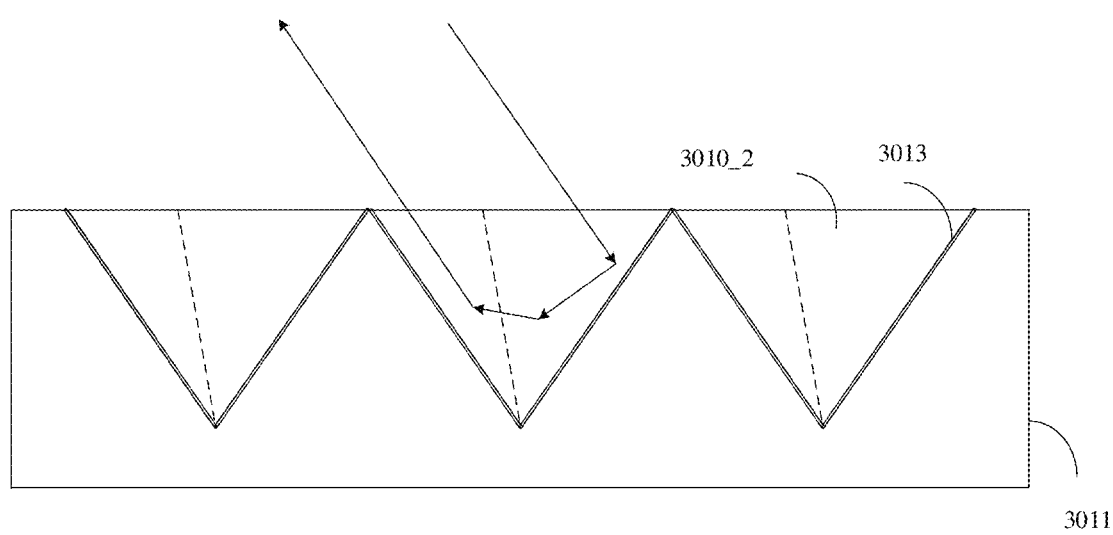
FIG. 32 is a schematic diagram of a light path of the retro-reflective element as shown in FIG. 31.

FIG. 31 is a structural schematic diagram of a further retro-reflective element provided by some embodiments of the present disclosure. The retro-reflective element shown in FIG. 31 is similar to the retro-reflective element shown in FIG. 29; and differences between the retro-reflective element shown in FIG. 31 and the retro-reflective element shown in FIG. 29 include: (1) the reflective microstructure 3010 (the hollow reflective microstructure 3010_2) included in the retro-reflective element shown in FIG. 31 is a hollow triangular pyramid structure having an equilateral-triangular cross section; (2) the reflective microstructure 3010 (the hollow reflective microstructure 3010_2) included in the retro-reflective element shown in FIG. 31 is located on a side of the substrate 3011 that is close to the diffusing element 300; (3) a reflective layer 3013 is provided on the reflective surface 3015 (i.e., the inner surface of the hollow reflective microstructure 3010_2) of the reflective microstructure 3010 (the hollow reflective microstructure 3010_2), that is, the reflective layer 3013 may be arranged on a side of the reflective surface 3015 of the reflective microstructure 3010 (the hollow reflective microstructure 3010_2) that is close to the diffusing element 300. For example, the substrate 3011 and the plurality of reflective microstructures 3010 shown in FIG. 31 may be integrally formed. FIG. 32 is a schematic diagram of a light path of the retro-reflective element shown in FIG. 31; and an orientation of an arrow in FIG. 32 indicates a transmission direction of light.

Figure 33:
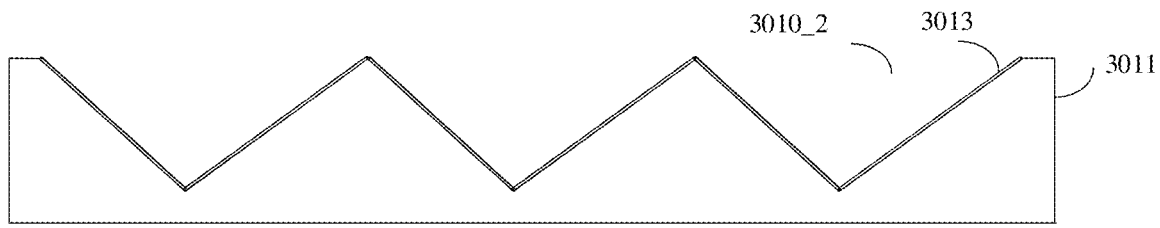
FIG. 33 is a structural schematic diagram of still another retro-reflective element provided by some embodiments of the present disclosure.
Figure 34:
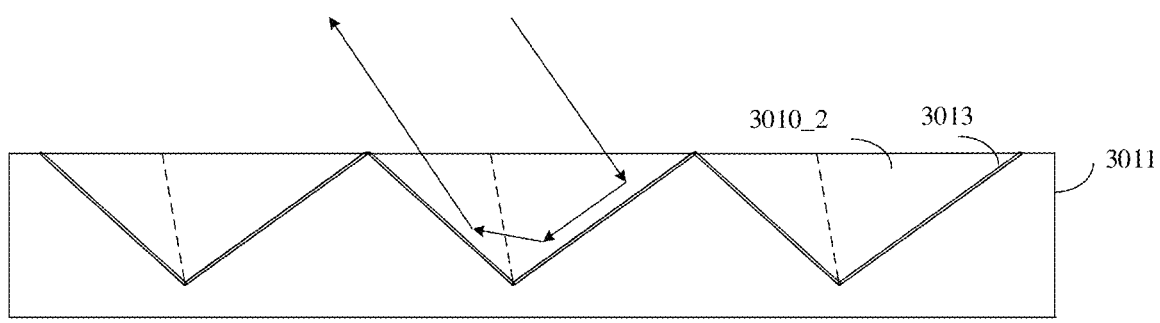
FIG. 34 is a schematic diagram of a light path of the retro-reflective element as shown in FIG. 33.

FIG. 33 is a structural schematic diagram of still another retro-reflective element provided by some embodiments of the present disclosure. FIG. 34 is a schematic diagram of a light path of the retro-reflective element shown in FIG. 33. The retro-reflective element shown in FIG. 33 is similar to the retro-reflective element shown in FIG. 31; and a difference between the retro-reflective element shown in FIG. 33 and the retro-reflective element shown in FIG. 31 includes the reflective microstructure 3010 included in the retro-reflective element shown in FIG. 33 is a hollow triangular pyramid structure having an isosceles-triangular (non-right-triangular) cross section, while the reflective microstructure 3010 included in the retro-reflective element shown in FIG. 31 is a hollow triangular pyramid structure having an equilateral-triangular cross section.

Figure 35:
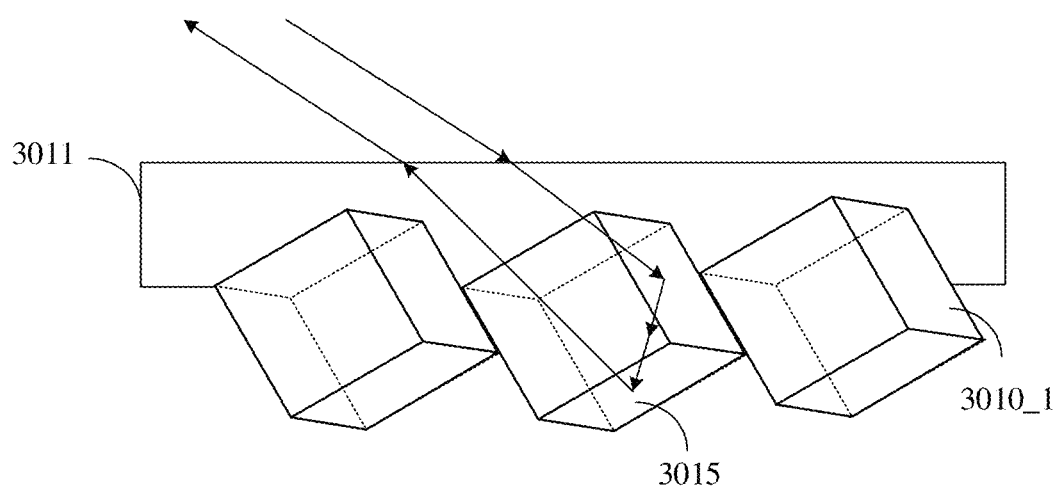
FIG. 35 is a structural schematic diagram of still another retro-reflective element provided by some embodiments of the present disclosure.

FIG. 35 is a structural schematic diagram of still another retro-reflective element provided by some embodiments of the present disclosure. The retro-reflective element shown in FIG. 35 is similar to the retro-reflective element shown in FIG. 29; a difference between the retro-reflective element shown in FIG. 35 and the retro-reflective element shown in FIG. 29 includes the reflective microstructure 3010 included in the retro-reflective element shown in FIG. 35 is a solid cubic structure having a rectangular cross section, while the reflective microstructure 3010 included in the retro-reflective element shown in FIG. 29 is a solid triangular pyramid structure having an equilateral-triangular cross section.

Figure 36:
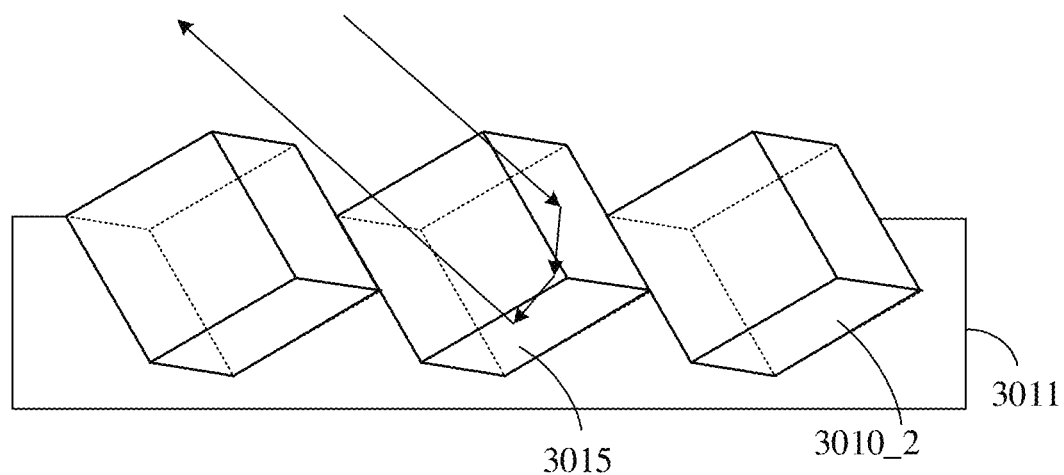
FIG. 36 is a structural schematic diagram of still another retro-reflective element provided by some embodiments of the present disclosure.

FIG. 36 is a structural schematic diagram of still another retro-reflective element provided by some embodiments of the present disclosure. The retro-reflective element shown in FIG. 36 is similar to the retro-reflective element shown in FIG. 31; and a difference between the retro-reflective element shown in FIG. 36 and the retro-reflective element shown in FIG. 31 includes the reflective microstructure 3010 included in the retro-reflective element shown in FIG. 36 is a hollow cubic structure having a rectangular cross section, while the reflective microstructure 3010 included in the retro-reflective element shown in FIG. 31 is a hollow triangular pyramid structure having an equilateral-triangular cross section. For example, for specific description of the solid and the hollow triangular pyramid structures and the solid and the hollow cubic structures, the foregoing embodiment may be referred to, and no details will be repeated here.

For example, at least one embodiment of the present disclosure further provides another head-up display device, which includes a light control device. The light control device includes a retro-reflective element and a diffusing element; the retro-reflective element is configured to reflect light incident on the retro-reflective element in a direction opposite to an incident direction of the light incident on the retro-reflective element; the diffusing element is configured to diffuse light incident on the diffusing element; light emitted by the image source, incident on the transflective device, and used for forming an image is reflected by the transflective device onto the light control device; the light reflected onto the light control device passes through the diffusing element and is reflected back to the diffusing element by the retro-reflective element; and the light reflected back to the diffusing element passes through the diffusing element, is incident onto the transflective device again, and is reflected again by the transflective device, to form a virtual image on a side, away from the image source, of the transflective device.

Some embodiments of the present disclosure further provide a motor vehicle, which includes the head-up display device according to any one of the above-described embodiments. The motor vehicle provided by some embodiments of the present disclosure adopts the above-described head-up display device; for example, the above-described head-up display device allows a driver to directly see richer information, for example, a navigation map, complex safety information, and other large-sized picture without looking down at a dashboard during driving, which, thus, may better meet the driver's needs for controlling various types of information during driving the vehicle.

Although the present disclosure has been described in detail with general description and specific implementing modes, it is obvious to those skilled in the art that some modifications or improvements may be made on the basis of the embodiments of the present disclosure. Therefore, these modifications and improvements made without departing from the spirit of the present disclosure all fall within the protection scope of the present disclosure.

What has been described above merely are exemplary embodiments of the present disclosure, and not intended to define the scope of the present disclosure, and the scope of the present disclosure is determined by the appended claims.

The invention claimed is:

1. A head-up display device, comprising an image source, a transflective device, and a light control device,
    wherein the image source is configured to emit light for forming an image;
    the transflective device is configured to reflect light, which is emitted from the image source and incident on the transflective device, and transmit ambient light incident on the transflective device;
    the light control device comprises a retro-reflective element and a diffusing element;
    the retro-reflective element is configured to reflect light incident on the retro-reflective element in an direction opposite to an incident direction of the light incident on the retro-reflective element;
    the diffusing element is configured to diffuse light incident on the diffusing element;
    the image source firstly emits the light for forming the image; the light for forming the image is incident on the transflective device; the light emitted by the image source and incident on the transflective device is subjected to a first reflection by the transflective device; the light subjected to the first reflection by the transflective device is incident on the light control device, passes through the diffusing element, and then is incident on the retro-reflective element; the retro-reflective element allows the light incident on the retro-reflective element to be emitted in the direction opposite to the incident direction of the light incident on the retro-reflective element; the light emitted in the direction opposite to the incident direction of the light incident on the retro-reflective element passes through the diffusing element and is diffused by the diffusing element; the light diffused by the diffusing element is incident on the transflective device, and is subjected to a second reflection by the transflective device to form a virtual image.

2. The head-up display device of claim 1, wherein the diffusing element adopts a device configured to diffuse the light incident on the diffusing element to form one or more beams having a certain shape.

3. The head-up display device of claim 2, wherein a cross-sectional shape of the beam comprises at least one selected from the group consisting of linear shape, circular shape, elliptical shape, square shape, and rectangular shape.

4. The head-up display device of claim 1, wherein the retro-reflective element comprises a substrate and a plurality of microstructures at the substrate.

5. The head-up display device of claim 4, wherein a reflective layer is between the substrate and the microstructures.

6. The head-up display device of claim 5, wherein reflectance of the reflective layer ranges from 50% to 95%.

7. The head-up display device of claim 5, wherein the microstructure is a spatial structure comprising three faces perpendicular to each other pairwise; and the three faces are all configured as reflective surfaces; or
    the microstructure adopts a spherical structure.

8. The head-up display device of claim 7, wherein the spatial structure adopts a hollow concave structure or adopts a structure with a solid center, and a material of the structure with the solid center comprises a transparent material; and
    in a case where the spatial structure adopts the hollow concave structure, three inner surfaces perpendicular to each other of the hollow concave structure are configured as the reflective surfaces; and in a case where the spatial structure adopts the structure with the solid center, three outer surfaces perpendicular to each other of the structure with the solid center are configured as the reflective surfaces.

9. The head-up display device of claim 8, wherein the microstructure is a triangular pyramid structure comprising three triangles perpendicular to each other pairwise or a cubic structure comprising three rectangles perpendicular to each other pairwise.

10. The head-up display device of claim 9, wherein at least one of the reflective surfaces is provided with a reflective layer; and reflectance of the reflective layer ranges from 50% to 95%.

11. The head-up display device according to claim 7, wherein the spherical structure adopts a structure with a solid center, and a material of the structure with the solid center comprises a transparent material.

12. The head-up display device of claim 1, wherein the image source adopts a projecting device; the transflective device adopts a windshield of a transportation tool; the projecting device is configured to emit light to the windshield of the transportation tool; and the light control device is below the windshield of the transportation tool.

13. The head-up display device of claim 12, wherein the projecting device comprises a lens portion.

14. The head-up display device of claim 1, wherein the diffusing element is on a side, close to the transflective device, of the retro-reflective element.

15. The head-up display device of claim 14, wherein an orthographic projection of the transflective device on a plane, where the diffusing element is located, at least partially overlaps the diffusing element.

16. The head-up display device of claim 14, wherein the image source is on a side, away from the virtual image, of the transflective device;
    an orthographic projection of the image source on a plane where the diffusing element is located and an orthographic projection of the transflective device on the plane where the diffusing element is located are spaced apart from each other; and
    the orthographic projection of the image source on the plane where the diffusing element is located and the light control device are spaced apart from each other.

17. A motor vehicle, comprising the head-up display device of claim 1.

18. A head-up display device, comprising a light control device,
    wherein the light control device comprises a retro-reflective element and a diffusing element;

the retro-reflective element is configured to reflect light incident on the retro-reflective element in a direction opposite to an incident direction of the light incident on the retro-reflective element;

the diffusing element is configured to diffuse light incident on the diffusing element;

light, which is emitted by an image source, for use of being incident on a transflective device, and for use of forming an image, is reflected by the transflective device to the light control device; the light reflected to the light control device passes through the diffusing element and then is reflected back to the diffusing element by the retro-reflective element; the light reflected back to the diffusing element passes through the diffusing element, is incident on the transflective device again, and is reflected by the transflective device again, to form a virtual image on a side, away from the image source, of the transflective device.

19. The head-up display device of claim 18, further comprising the transflective device, wherein the transflective device is configured to reflect the light, which is emitted from the image source and incident on the transflective device, and transmit ambient light incident on the transflective device; and the diffusing element is on a side, close to the transflective device, of the retro-reflective element, and an orthographic projection of the transflective device on a plane where the diffusing element is located at least partially overlaps the diffusing element.

20. The head-up display device of claim 18, further comprising the image source, wherein the image source is on a side, away from the virtual image, of the transflective device;

an orthographic projection of the image source on a plane where the diffusing element is located and the orthographic projection of the transflective device on the plane where the diffusing element is located are spaced apart from each other; and the orthographic projection of the image source on the plane where the diffusing element is located and the light control device are spaced apart from each other.

* * * * *